US011768297B2

(12) United States Patent
Rautalin et al.

(10) Patent No.: US 11,768,297 B2
(45) Date of Patent: Sep. 26, 2023

(54) DETERMINING TRANSMISSION CHARACTERISTICS FOR TRANSMITTING CORRECTION DATA

(71) Applicant: HERE GLOBAL B.V., Eindhoven (NL)

(72) Inventors: Sakari Rautalin, Tampere (FI); Erik Stefan Söderholm, Espoo (FI)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 17/479,036

(22) Filed: Sep. 20, 2021

(65) Prior Publication Data

US 2022/0179101 A1 Jun. 9, 2022

(30) Foreign Application Priority Data

Sep. 22, 2020 (EP) .................................... 20197519

(51) Int. Cl.
*G01S 19/07* (2010.01)
*G01S 19/24* (2010.01)
*G01S 19/08* (2010.01)
*G01S 19/30* (2010.01)
*G01S 19/29* (2010.01)

(52) U.S. Cl.
CPC ............. *G01S 19/07* (2013.01); *G01S 19/24* (2013.01); *G01S 19/08* (2013.01); *G01S 19/29* (2013.01); *G01S 19/30* (2013.01)

(58) Field of Classification Search
CPC .......... G01S 19/07; G01S 19/08; G01S 19/24; G01S 19/29; G01S 19/30
USPC ............ 342/357.69, 357.44, 357.45, 357.63, 342/357.68
See application file for complete search history.

(56) References Cited

U.S. PATENT DOCUMENTS 6,133,874 A * 10/2000 Krasner ................ G01S 19/252
  342/357.43
6,285,315 B1 * 9/2001 Pratt ....................... G01S 19/05
  342/357.44
6,313,787 B1 11/2001 King et al.
(Continued)

FOREIGN PATENT DOCUMENTS

EP        3572844 A1   11/2019
WO    WO 99/18677 A1    4/1999
WO   WO 2020/039659 A1   2/2020

OTHER PUBLICATIONS

"Hexagon Correction Services", Retrieved via the Wayback Machine, [Retrieved Nov. 22, 2021], URL:<https://web.archive.org/web/20190103103103/https://hexagonpositioning.com/autonomous-x/automotive-positioning/serial-production/correction-services>. (Jan. 3, 2019), 5 pages.
"Positioning Services—Get Trimble RTX To Work For You", Retrieved via the Wayback Machine, [Retrieved Nov. 21, 2021], URL:<https://web.archive.org/web/20191001023859/https://positioningservices.trimble.com/services/rtx/>. (Oct. 1, 2019), 3 pages.

(Continued)

*Primary Examiner* — Chuong P Nguyen
(74) *Attorney, Agent, or Firm* — John J. McKearin; HERE GLOBAL B.V.

(57) ABSTRACT

A method, performed by at least one apparatus, is provided that includes obtaining or determining one or more stability parameters for a specific satellite. The method also includes determining, at least partially based on the one or more stability parameters for the specific satellite, one or more transmission characteristics for transmitting correction data for the specific satellite. A corresponding apparatus and a computer readable storage medium are also provided.

20 Claims, 5 Drawing Sheets

(56) References Cited

U.S. PATENT DOCUMENTS

| | | | |
|---|---|---|---|
| 6,985,104 B2 | 1/2006 | Large et al. | |
| 6,992,617 B2 * | 1/2006 | Diggelen | G01S 19/05 455/13.1 |
| 7,589,667 B2 * | 9/2009 | van Diggelen | G01S 19/05 342/357.45 |
| 7,840,351 B2 * | 11/2010 | Hwang | G01S 19/07 701/478.5 |
| 8,497,774 B2 | 7/2013 | Scalisi et al. | |
| 11,187,808 B2 * | 11/2021 | Gao | G01S 19/07 |
| 11,187,813 B2 * | 11/2021 | Brandl | G05D 1/0022 |
| 2009/0179793 A1 | 7/2009 | Remondi | |
| 2010/0262369 A1 | 10/2010 | Trautenberg | |
| 2011/0169693 A1 * | 7/2011 | Trautenberg | G01S 19/08 342/357.58 |
| 2016/0077211 A1 | 3/2016 | Xianglin | |
| 2016/0370467 A1 * | 12/2016 | Gao | G01S 19/07 |
| 2021/0109228 A1 * | 4/2021 | Rautalin | G01S 19/27 |
| 2021/0341625 A1 * | 11/2021 | Gupta | G06N 20/00 |
| 2022/0058322 A1 * | 2/2022 | Brandl | G01S 19/44 |
| 2022/0107427 A1 * | 4/2022 | Kleeman | G01S 19/07 |

OTHER PUBLICATIONS

"Sapcorda Releases Unique Data Service for High Precision GNSS in USA and Europe", Retrieved via the Wayback Machine, [Retrieved Nov. 22, 2021], URL:<https://web.archive.org/web/20200312111146/https://www.sapcorda.com/pr-sapapremium/>, (Mar. 12, 2020), 3 pages.

Extended European Search Report for European Application No. 20197519.0 dated Mar. 10, 2021, 10 pages.

Gao et al., "A New Method for Real-Time PPP Correction Updates", International Symposium on Earth and Environmental Sciences for Future Generations, International Association of Geodesy Symposia, vol. 147, (2016), 7 pages.

Spilker, Jr. et al., "Global Positioning System: Theory and Applications, vol. 1", American Institute of Aeronautics and Astronautics, Inc., (Jan. 1, 1996), pp. 122-149.

Wolf et al., "EGNOS CPF Check Set—Stand Alone Performance", Proceedings of the 15th International Technical Meeting of the Satellite Division of The Institute of Navigation (ION GPS 2002), (Sep. 2002), pp. 1736-1745.

* cited by examiner

DETERMINING TRANSMISSION CHARACTERISTICS FOR TRANSMITTING CORRECTION DATA

CROSS-REFERENCE TO RELATED APPLICATIONS

This application claims priority to European Application No. 20197519.0, filed Sep. 22, 2020, the entire contents of which are incorporated herein by reference.

FIELD OF THE DISCLOSURE

Various example embodiments of the invention relate to the field of satellite signal based positioning and more specifically to the transmission of correction data assisting satellite signal based positioning.

BACKGROUND

Navigation Satellite Systems (e.g. Global Navigation Satellite Systems GNSS) are the backbones of positioning solutions. For positioning, a mobile device may receive satellite positioning signals from various GNSS satellites and utilize these signals to determine a position estimate of its position. However, such a position estimate may be inaccurate due to several types of errors such as for example satellite clock errors, satellite orbit errors or ionospheric delays. Correcting some or even all of these types of errors by means of correction data that are considered when determining the position estimate may improve the accuracy of the position estimate.

Correction data for improving the accuracy of a position estimate may change over time and the more often new correction data is transmitted to a mobile device, the more accurate may be the position estimate determined by the mobile device. However, the amount of correction data that is transmitted to a mobile device for example by a server providing such correction data is in some cases critical, since bandwidth for data transmission to the mobile device may be limited.

SUMMARY OF SOME EMBODIMENTS OF THE INVENTION

When using a navigation satellite system for determining a position estimate of a mobile device's true position, the mobile device may receive a satellite positioning signal from each specific satellite of a plurality of satellites (e.g. at least four satellites) of the navigation satellite system. Each satellite positioning signal of the received satellite positioning signals may convey at least satellite ephemeris data and signal timing data for the specific satellite that transmits the satellite positioning signal. Therein, each satellite positioning signal may convey further data such as for example satellite almanac data and satellite health message for the specific satellite, ionospheric delay data or other data. In particular, data that are conveyed in a satellite positioning signal for example may be included in a navigation message that is conveyed by the satellite positioning signal.

Satellite ephemeris data for a specific satellite may enable determining an orbital position and velocity of the specific satellite at a given time. For example, such determining an orbital position and velocity of a specific satellite at a given time may at least partially depend on a set of ephemeris parameters (e.g. extensions to Keplerian orbital parameters) that is included in the ephemeris data for the specific satellite.

Signal timing data for a specific satellite may enable determining a pseudorange between the specific satellite sending the respective satellite positioning signal and a mobile device receiving the respective satellite positioning signal. For example, signal timing data comprise an emission time of the satellite positioning signal that conveys the signal timing data. The emission time of a satellite positioning signal may be understood to mean the time at which the signal is emitted by the specific satellite to a mobile device, while the time at which the satellite positioning signal is received at the mobile device may be termed reception time. Subtracting emission time from reception time of the same satellite positioning signal may provide the propagation time of the satellite positioning signal.

While for example the emission time of the satellite positioning signal included in the signal timing data may be measured in a timescale of a satellite clock carried by the specific satellite that transmits the satellite positioning signal, the reception time may be measured in a timescale of a clock carried by the mobile device. For determining the propagation time, the emission time may be converted to a common timescale, for example a system timescale of the navigation satellite system to which the specific satellite belongs. For this conversion, the signal timing data conveyed by the satellite positioning signal may comprise clock offset data that enables converting a time (e.g. the emission time) from the satellite clock timescale to for example the system timescale of the navigation satellite system at least partially based on the clock offset data. For example, such converting of a time (e.g. the emission time) to the system timescale may be at least partially based on a set of clock offset parameter that is included in the clock offset data. Regarding reception time, an offset between the reception time in system timescale and the reception time in a timescale of the clock carried by the mobile device may be treated as additional unknown when solving an equation system for determining a position estimate as further described below.

Multiplying the propagation time with the speed of light yields a pseudorange between the specific satellite sending the satellite positioning signal and the mobile device receiving the satellite positioning signal. Since such pseudorange may include clock offsets as described above, the pseudorange may be understood as an estimate of the distance between the specific satellite and the mobile device plus a distance error due to clock offsets.

Considering the example described above of a mobile device receiving a satellite positioning signal from each specific satellite of the plurality of satellites, the mobile device may for each satellite positioning signal determine at least partially based on the respective signal timing data conveyed by the satellite positioning signal a corresponding pseudorange. Additionally, the mobile device may determine at least partially based on the satellite ephemeris data conveyed by each satellite positioning signal an orbital position of the respective satellite at a given time (e.g. at the corresponding emission time of the satellite positioning signal in system timescale).

Subsequently, the mobile device may determine a position estimate of its true position at a given time at least partially based on the orbital position and pseudorange determined for each specific satellite of the plurality of satellites. For example, this step of determining a position estimate may comprise solving a equation system that includes the determined pseudoranges and the determined orbital positions. A minimum of four satellite positioning signals received by the mobile device may be necessary to solve such a equation system due to four unknowns (e.g. three unknowns may be geographical coordinate components and one unknown may be an offset between the reception time in system timescale and the reception time in a timescale of the clock carried by the mobile device). Therein, the position estimate may at least partially be represented in form of geographical coordinates such as longitude and latitude of a global coordinate system.

It is to be understood that the determined position estimate of the mobile device's position at a given time may deviate from the true position of the mobile device at this given time, which may for example mean that geographical coordinates representing the position estimate deviate from geographical coordinates representing the true position. For example, such an inaccurate position estimate may be at least partially caused by errors in the pseudorange and/or orbital position determined for a specific satellite of the plurality of satellites. These errors may occur for example due to an unstable orbit and/or unstable clock of the specific satellite and may be reduced by correction data for the specific satellite that may be transmitted to the mobile device and utilized at the mobile device when determining the position estimate.

According to an exemplary aspect of the invention, a method performed by at least one apparatus is disclosed, wherein the method comprises:
  obtaining or determining one or more stability parameters for a specific satellite; and
  determining, at least partially based on the one or more stability parameters for the specific satellite, one or more transmission characteristics for transmitting correction data for the specific satellite.

For example, the at least one apparatus performing the method may be a mobile device (e.g. a mobile device, for whose position a position estimate is to be determined) or a part thereof. Additionally or alternatively, the at least one apparatus performing the method may be a stationary device (e.g. a server) or a part thereof.

The above disclosed method may be part of a GNSS based positioning solution, such as a process described above. For example, considering a process for determining a position estimate of a mobile device's position as described above, the disclosed method may be performed at any time before a step of a determining a position estimate at least partially based on the orbital position and pseudorange determined for each specific satellite of the plurality of satellites. In particular, after determining one or more transmission characteristics and transmitting correction data for a specific satellite of the plurality of satellites to the mobile device, these correction data may be utilized at the mobile device for correcting the orbital position and pseudoranges determined for the specific satellite and thus for increasing the accuracy of a position estimate.

A stability parameter for a specific satellite may be understood as a parameter which is indicative of a stability of the satellite at a given time. A stability of a specific satellite may be considered under different aspects, as it may refer to for example a stability of an orbit of the satellite or a stability of a clock of the satellite. Accordingly, in some examples, more than one stability parameter for a specific satellite may be indicative of a stability a specific satellite, which may be understood to mean that for example one or more stability parameters may be indicative of the stability of an orbit of the satellite at a given time and that additionally or alternatively one or more stability parameters may be indicative of the stability of a clock of the satellite at a given time.

A stability parameter that is indicative of a stability of a specific satellite may for example indicate (e.g. by a numerical or a Boolean value) whether an orbit or clock of the specific satellite is stable or unstable. Additionally or alternatively, a stability parameter may indicate a degree of stability of a specific satellite. For example, a less stable orbit or clock of the satellite may be indicated by a larger or smaller value (e.g. a numerical value) of a stability parameter. In other examples, a change in a value (e.g. a numerical or a Boolean value) of a stability parameter over time may indicate a stability of a specific satellite, which may be understood to mean that a constant numerical or boolean value of a stability parameter over time may indicate a stable orbit or a stable clock of a specific satellite, while a change in a numerical or boolean value of a stability parameter over time may indicate an unstable orbit or an unstable clock of the specific satellite.

An orbit of a specific satellite may be understood as a trajectory that the specific satellite follows, which is for example a gravitationally curved trajectory followed by the specific satellite around the Earth. In this case, the orbit of the specific satellite may for example be represented by an orbit model that comprises a set of orbital parameters (e.g. Keplerian orbital parameters), such that a position or velocity of the specific satellite may be determined at least partially based on the set of orbital parameters at a given time.

For example, an orbit of a specific satellite may change over time (e.g. for a limited period of time), which may be understood to mean that the trajectory followed by the specific satellite may change over time (e.g. for a limited period of time). Such a change over time may be a result of an unexpected maneuver of the specific satellite or of forces that affect the specific satellite (e.g. forces due to gravity of the Earth or Moon, or forces due to solar radiation pressure) not remaining constant but changing over time. If for example a specific satellite is entering or leaving the Earth's shadow, forces acting on the specific satellite may change, which may result in a change of the trajectory followed by the specific satellite and thus in a change of the orbit of the specific satellite.

In one example, a stability of a specific satellite (e.g. a stability of an orbit of the specific satellite) may at least partially depend on an orbit of the specific satellite. In particular, a stability of a specific satellite (e.g. a stability of an orbit of the specific satellite) may at least partially depend on a change of an orbit of the specific satellite over time (e.g. on whether the orbit changes rather slowly or rapidly). In such examples, a stability parameter for a specific satellite may be indicative of a change of an orbit of the specific over time (e.g. a change within a predetermined time period).

Assuming that for example the orbit of a specific satellite changes over time, this change may cause a difference (e.g. a deviation) between (1) an orbital position determined (e.g. by a mobile device) at a given time based on satellite ephemeris data conveyed by a satellite positioning signal transmitted by the specific satellite (e.g. to the mobile device) and (2) a true orbital position of the specific satellite at this given time. To consider such difference in orbital position and to still determine an accurate position estimate based on the determined orbital position of the specific satellite, correction data for the specific satellite (e.g. correction data for the specific satellite that is held available at a mobile device which determines a position estimate of its position) may be utilized to correct the determined orbital position of the specific satellite, for example by determining the orbital position of the specific satellite at least based on satellite ephemeris data and correction data for the specific satellite.

An orbit of a specific satellite may be considered stable if for example the orbit changes (e.g. changes slowly enough) over time such that a change over time (e.g. an increase or a decrease within a predetermined time range) in the above mentioned difference between (1) an orbital position determined (e.g. by a mobile device) at a given time based on satellite ephemeris data conveyed by a satellite positioning signal transmitted by the specific satellite (e.g. to the mobile device) and (2) a true orbital position of the specific satellite at this given time may be sufficiently small (e.g. smaller than a predetermined threshold). For example, a change over time in the above mentioned difference is sufficiently small such that correction data for the specific satellite that is held available at a mobile device which determines a position estimate of its position may be utilized to correct the determined orbital position of the specific satellite to still determine an accurate position estimate based on the determined orbital position of the specific satellite.

In another example, an orbit of a specific satellite may be considered unstable if for example the orbit changes (e.g. changes rather rapidly) over time such that a change over time (e.g. an increase or a decrease within a predetermined time period) in the above mentioned difference between (1) an orbital position determined (e.g. by a mobile device) at a given time based on satellite ephemeris data conveyed by a satellite positioning signal transmitted by the specific satellite (e.g. to the mobile device) and (2) a true orbital position of the specific satellite at this given time may be too large (e.g. larger than a predetermined threshold). For example, a change over time in the above mentioned difference is too large such that correction data for the specific satellite that is held available at a mobile device which determines a position estimate of its position may not be utilized to correct the determined orbital position of the specific satellite to still determine an accurate position estimate based on the determined orbital position of the specific satellite. Instead, in such an example of an unstable orbit, newer correction data at the mobile device may be necessary for determining an accurate position estimate.

Considering the examples above, a stability parameter (e.g. an orbit stability parameter) for a specific satellite may for example at least partially depend on (e.g. may be given by) a change over time (e.g. an increase or a decrease within a predetermined time period) in the above mentioned difference between (1) an orbital position determined (e.g. by a mobile device) at a given time based on satellite ephemeris data conveyed by a satellite positioning signal transmitted by the specific satellite (e.g. to the mobile device) and (2) a true orbital position of the specific satellite at this given time. If for example this change over time as stability parameter may be too large (e.g. larger than a predetermined stability threshold), this may indicate that the specific satellite's orbit may be unstable and that new correction data at a mobile device determining a position estimate may be necessary for determining an accurate position estimate. For example, determining the above mentioned change over time (by e.g. determining an estimate for this change over time) as stability parameter may at least partially depend on at least one of an orbit model for the specific satellite or correction data for the specific satellite as further described below.

A clock of a specific satellite may be understood as any kind of clock device carried by the specific satellite, which clock device is for example an oscillator such as a quartz or rubidium oscillator. For example, the oscillatory period of the oscillator changes over time (e.g. for a limited period of time), which may be a result of for example radiation exposure, temperature variation, aging, relativistic effects or even a sudden stoppage of work of the clock.

In one example, a stability of a specific satellite (e.g. a stability of a clock of the specific satellite) may at least partially depend on a clock carried by the specific satellite. In particular, a stability of a specific satellite (e.g. a stability of a clock of the specific satellite) may at least partially depend on a change of an oscillatory period of the clock's oscillator over time (e.g. on whether the oscillatory period changes rather slowly or rapidly). In such examples, a stability parameter for a specific satellite may for example be indicative of a change of an oscillatory period of the clock's oscillator over time (e.g. a change within a predetermined time period).

Assuming that for example the oscillatory period of a specific satellite's clock oscillator changes over time, this change may cause a difference (e.g. a deviation) between (1) an emission time of a satellite positioning signal converted to a system timescale based on clock offset data included in signal timing data conveyed by a satellite positioning signal transmitted by the specific satellite (e.g. to the mobile device) and (2) the true emission time in the system timescale. To consider such difference in the emission time in system timescale and to still determine an accurate position estimate based on the determined emission time in system timescale, correction data for the specific satellite (e.g. correction data for the specific satellite that is held available at a mobile device which determines a position estimate of its position) may be utilized to correct the converted emission time, for example by converting the emission time in system timescale at least based on signal timing data and correction data for the specific satellite.

A clock of a specific satellite may be considered stable if for example an oscillatory period of a specific satellite's clock oscillator changes (e.g. changes slowly enough) over time such that a change over time (e.g. an increase or a decrease within a predetermined time period) in the above mentioned difference between (1) an emission time of a satellite positioning signal converted to a system timescale based on clock offset data included in signal timing data conveyed by a satellite positioning signal transmitted by the specific satellite (e.g. to the mobile device) and (2) the true emission time in the system timescale may be sufficiently small (e.g. smaller than a predetermined threshold). For example, a change over time in the above mentioned difference is sufficiently small such that correction data for the specific satellite that is held available at a mobile device which determines a position estimate of its position may be utilized to correct the converted emission time in system timescale to still determine an accurate position estimate based on the converted emission time in system timescale.

In another example, a clock of a specific satellite may be considered unstable if for example an oscillatory period of a specific satellite's clock oscillator changes (e.g. changes rather rapidly) over time such that a change over time (e.g. an increase or a decrease within a predetermined time period) in the above mentioned difference between (1) an emission time of a satellite positioning signal converted to a system timescale based on clock offset data included in signal timing data conveyed by a satellite positioning signal transmitted by the specific satellite (e.g. to the mobile device) and (2) the true emission time in the system timescale may be too large (e.g. larger than a predetermined threshold). For example, a change over time in the above mentioned difference is sufficiently small such that correction data for the specific satellite that is held available at a mobile device which determines a position estimate of its position may not be utilized to correct the converted emission time in system timescale to still determine an accurate position estimate based on the converted emission time in system timescale. Instead, in such an example of an unstable clock, newer correction data at the mobile device may be necessary for determining an accurate position estimate.

Considering the examples above, a stability parameter (e.g. an clock stability parameter) for a specific satellite may for example at least partially depend on (e.g. may be given by) a change over time (e.g. an increase or a decrease within a predetermined time period) in the above mentioned difference between (1) an emission time of a satellite positioning signal converted to a system timescale based on clock offset data included in signal timing data conveyed by a satellite positioning signal transmitted by the specific satellite (e.g. to the mobile device) and (2) the true emission time in the system timescale. If for example this change over time as stability parameter may be too large (e.g. larger than a predetermined stability threshold), this may indicate that the specific satellite's clock may be unstable and that new correction data at a mobile device determining a position estimate may be necessary for determining an accurate position estimate. For example, determining the above mentioned change over time (by e.g. determining an estimate for this change over time) as stability parameter may at least partially depend on at least one of a clock model for the specific satellite or correction data for the specific satellite as further described below.

In one example, determining a stability parameter for a specific satellite may at least partially depend on a model for the specific satellite. For example, if a stability parameter is indicative of a stability of an orbit of a specific satellite, the stability parameter may be determined at least partially based on an orbit model for the specific satellite. Such an orbit model may represent the orbit of the specific satellite at a given time and/or during a given time period and enable determining an orbital position (e.g. predicting or estimating a true orbital position) of the specific satellite at a given time and/or during a given time period. If, in another example, a stability parameter is indicative of a stability of a clock of a specific satellite, the stability parameter may be determined at least partially based on a clock model for the specific satellite. Such a clock model may for example represent a difference between a timescale of the satellite clock and a system timescale at a given time (e.g. an emission time of a satellite positioning signal) and/or during a given time period. Based on a change over time (e.g. an increase or decrease over time) in this difference which may result from the oscillatory period of the satellite clock changing over time (e.g. due to radiation exposure, temperature variation, aging, relativistic effects) and which may be captured by the clock model, the clock model may enable determining a corresponding stability parameter In another example, the determining a stability parameter for a specific satellite may at least partially depend on correction data for the specific satellite. Correction data for a specific satellite may be utilized by a mobile device for increasing the accuracy of a position estimate by correcting for deviations that occur when determining the position estimate at least partially based on a satellite positioning signal received from the specific satellite. For example, correction data may comprise at least orbital correction parameters and/or clock correction parameters. Orbit correction parameters may correct for a deviation between an orbital position determined based on satellite ephemeris data and the true orbital position of the specific satellite at a given time (e.g. an arbitrary time within a predetermined period such as a validity period of the correction data comprising the orbit correction parameters). Clock correction parameters may correct for a deviation between a time (e.g. an arbitrary time within a predetermined period such as a validity period of the correction data comprising the clock correction parameters) in a system timescale determined based on clock offset data included in the signal timing data and the true time in a system timescale.

For example, a larger correction of an orbital position (e.g. indicated by orbital correction parameters included in correction data for a specific satellite) may indicate that the orbit of the specific satellite is less stable and/or a larger correction of a clock offset between system timescale and satellite clock timescale (e.g. indicated by clock correction parameters included in correction data for a specific satellite) may indicate that the clock of the specific satellite is less stable.

In another example, a temporal evolution (e.g. a change such as an increase or decrease over time) in correction data for an orbital position (e.g. indicated by orbital correction parameters included in correction data for a specific satellite) may indicate that the orbit of the specific satellite is stable or unstable and/or a temporal evolution (e.g. a change such as an increase or decrease over time) in correction data for a clock offset between system timescale and satellite clock timescale (e.g. indicated by clock correction parameters included in correction data for a specific satellite) may indicate that the clock of the specific satellite is stable or unstable.

Therein, it may be considered that correction data for a specific satellite may be associated with a specific time (e.g. a validity time) as further described below. For example, a temporal evolution (e.g. a change such as an increase or decrease over time) in correction data for an orbital position (e.g. indicated by orbital correction parameters included in correction data for a specific satellite) and/or a temporal evolution (e.g. a change such as an increase or decrease over time) in correction data for a clock offset between system timescale and satellite clock timescale (e.g. indicated by clock correction parameters included in correction data for a specific satellite) may be determined based on first correction data of a first validity time and at least second correction data of a second validity time, wherein the second validity time is for example before or after the first validity time.

It is to be understood that in some examples, the at least one apparatus that performs the method disclosed above also determines the one or more stability parameters for a specific satellite. In other examples, the at least one apparatus that performs the method disclosed above may obtain one or more stability parameters for a specific satellite. Obtaining the one or more stability parameters may be understood to mean that the at least one apparatus performing the method disclosed above may receive the stability parameters from another apparatus (e.g. a remote server), which may provide the one or more stability parameters for a specific satellite.

As disclosed above, correction data for a specific satellite may be utilized by a mobile device for increasing the accuracy of a position estimate by correcting for deviations that occur when determining the position estimate at least partially based on a satellite positioning signal received from the specific satellite. The content of correction data for a specific satellite may be specified by the Radio Technical Commission for Maritime Services (RTCM) specifications (presently available under https://www.rtcm.org/).

As disclosed above, correction data for a specific satellite may for example comprise one or more orbital correction parameters that may correct for a deviation between an orbital position determined based on satellite ephemeris data and the true orbital position of the specific satellite at a given time (e.g. an arbitrary time within a predetermined period such as a validity period of the correction data comprising the orbit correction parameters). As such, orbital correction parameters may for example represent a difference between the true orbital position and the determined orbital position of the specific satellite, wherein the difference may be represented in a specific coordinate system. In one example, an osculating orbit coordinate system may be used, wherein the orbital correction parameters may represent respective differences between a determined and true orbital position in an along track component (in the direction of the velocity vector of the satellite), a cross track component (perpendicular to the orbit plane) and a radial component (completing a right-handed system). For example, for each component, orbital correction parameters may be coefficients of a polynomial function of time (e.g. within a predetermined period such as a validity period of the correction data comprising the orbital correction parameters).

In another example, correction data for a specific satellite may comprise one or more clock correction parameter that may correct for a deviation between a time (e.g. an arbitrary time within a predetermined period such as a validity period of the correction data comprising the clock correction parameters) in system timescale determined based on clock offset data included in signal timing data and the true time system timescale. As such, one or more clock correction parameter may for example represent a difference in a time in system timescale and the time in a satellite clock timescale, wherein the difference for example may be given by a polynomial function of time (e.g. within a predetermined period such as a validity period of the correction data comprising the parameters), for which for example three coefficients of a quadratic polynomial function may be given by three respective clock correction parameters.

It is to be understood that correction data for a specific satellite may be associated with a specific time such as for example a validity time. For example, correction data may contain or represent a validity time of the correction data. For example, the correction data may be valid for a predetermined validity period before and after such a validity time. Therein, correction data for a specific satellite may be considered valid if for example a position estimate determined at least based on a satellite positioning signal transmitted by the specific satellite at a given time (e.g. a time within the validity period of correction data) and correction data for the specific satellite is accurate. For example, a validity time may be represented by or contained in the correction data in a system time of a satellite navigation system to which the specific satellite belongs.

For example, correction data that are valid at a time at which the method disclosed above is performed may be termed current correction data, while correction data of an earlier validity time than current correction data may be termed previous or historic correction data.

In some examples, it may be necessary to transmit correction data (e.g. current correction data) for a specific satellite to a mobile device in order to be utilized by the mobile device when determining a position estimate (e.g. when the apparatus determining the correction data is not the mobile device). Therein, correction data (e.g. current correction data) for a specific satellite that are not yet transmitted to a mobile device may be termed "pending" correction data for a specific satellite. For example, pending correction data for a specific satellite are held available by an apparatus (e.g. a server) from which the correction data are to be transmitted to the mobile device (e.g. by storing the pending correction data in a memory of the apparatus at least until the pending correction data are transmitted to a mobile device). Accordingly, the term correction data may in particular refer to pending correction data in the following.

In some examples, the apparatus holding available correction data may be the at least one apparatus performing the method disclosed above or an apparatus different from the at least one apparatus performing the method disclosed above.

One or more transmission characteristics for transmitting correction data for a specific satellite may be understood as one or more characteristics according to which correction data for a specific satellite are to be transmitted. For example, such transmission may occur from a server holding available the correction data (e.g. the at least one apparatus performing the method disclosed above) to a mobile device at which the correction data for the specific satellite are utilized when determining a position estimate.

For example, a transmission characteristic for transmitting correction data for a specific satellite may specify the specific satellite (e.g. by means of a transmission indicator). Further, a transmission characteristic may for example specify whether correction data for a specific satellite is to be transmitted and, if the correction data is to be transmitted, at which time (e.g. a time in a system timescale of the navigation satellite system to which the specific satellite belongs) the correction data is to be transmitted (e.g. by means of a transmission time or a transmission pattern).

For example, after correction data have been transmitted from an apparatus (e.g. a server) providing these correction data to a mobile device, further (e.g. newer) correction data are held available by the apparatus as subsequent correction data. In such a case, new correction data may be transmitted periodically (e.g. 1 transmission event per 60 seconds or 10 transmission events per 60 seconds) to the mobile device according to for example a transmission rate as a number of transmission event per time unit or a transmission interval as time period between two subsequent transmission events. In this example, a transmission characteristic may specify the transmission rate or transmission interval for transmitting correction data.

For transmitting correction data for a specific satellite (e.g. to a mobile device utilizing the correction data), for example a wireline or wireless communication path between the apparatus providing the correction data and a mobile device receiving the correction data may be used. An example of such a wireless communication path is a wireless communication connection or link in a wireless communication network, in particular a terrestrial wireless communication network like a Wireless Local Area Network (WLAN) or a cellular network. WLAN is for example specified by the standards of the IEEE 802.11 family (http://www.ieee.org/). A cellular network may for example be mobile phone network like a 2G/3G/4G/5G or future generation cellular communication network. The 2G/3G/4G/5G or future generation cellular radio communication standards are developed by the 3GPP and presently available under http://www.3gpp.org/.

Determining one or more transmission characteristic for transmitting correction data for the specific satellite at least partially based on the one or more stability parameters for the specific satellite may be understood to mean that determining the one or more transmission characteristic may depend on the one or more stability parameters.

For example, a determined transmission characteristic may depend on whether a stability parameter for a specific satellite indicates that the specific satellite is unstable (e.g. by a Boolean value of the stability parameter). According to this example, if a stability parameter for a specific satellite indicates that the specific satellite is unstable (i.e. that e.g. an orbit or a clock of the specific satellite is unstable), the determined transmission characteristic may specify that correction data for this specific satellite is to be transmitted (e.g. to a mobile device utilizing the correction data). Additionally or alternatively, if a stability parameter for a specific satellite indicates that the specific satellite is unstable (i.e. that e.g. an orbit or a clock of the specific satellite is unstable), a determined transmission characteristic may be a transmission time, a transmission rate, a transmission interval or a transmission pattern according to which the correction data for the specific satellite is to be transmitted (e.g. to a mobile device utilizing the correction data).

In another example, the determined transmission characteristic may depend on whether a value (e.g. a numerical value) of a stability parameter for a specific satellite is smaller or larger than a predetermined stability threshold. This may be the case when the stability parameter indicates a degree of stability of the specific satellite. According to this example, if a value (e.g. a numerical value) of a stability parameter for a specific satellite is larger or smaller than a predetermined stability threshold, the determined transmission characteristic may specify that correction data for this specific satellite is to be transmitted to a mobile device. Additionally or alternatively, if a value of a stability parameter for a specific satellite is larger or smaller than a predetermined stability threshold, a determined transmission characteristic may be a transmission time, a transmission rate, a transmission interval, or a transmission pattern according to which the correction data for the specific satellite is to be transmitted (e.g. to a mobile device utilizing the correction data).

In another example, the determined transmission characteristic may depend on a change in a value (e.g. a numerical or a Boolean value) of a stability parameter over time. According to this example, if a value of a stability parameter for a specific satellite changes (e.g. the parameter increases or decreases if it is a numerical value) over time, the determined transmission characteristic may specify that correction data for this specific satellite is to be transmitted (e.g. to a mobile device utilizing the correction data). Additionally or alternatively, if a value of a stability parameter for a specific satellite changes (e.g. if the value of the stability parameter increases or decreases if it is a numerical value) over time, a determined transmission characteristic may be a transmission time, a transmission rate, a transmission interval, or a transmission pattern at which the correction data for the specific satellite is to be transmitted (e.g. to a mobile device utilizing the correction data).

Determining transmission characteristics for transmitting correction data for a specific satellite at least partially based on one or more stability parameters for the specific satellite may be advantageous, because the transmission characteristics may be adapted dynamically in dependence on a specific satellite's stability.

If for example a stability parameter indicates that a specific satellite is unstable (e.g. due to an unstable orbit or an unstable clock of the specific satellite), it may be determined dynamically (e.g. by a mobile device or a server) that correction data for this specific unstable satellite need to be transmitted to a mobile device such that the mobile device can determine an accurate position estimate partially based on a satellite positioning signal received from the specific satellite and the transmitted correction data. In such a case it may also be determined dynamically that the correction data for the specific unstable satellite need to be transmitted at an increased transmitting rate, at a shorter transmission interval or at a denser transmission pattern to ensure high positioning accuracy when determining a position estimate based on a satellite positioning signal received from the specific satellite and the correction data.

On the other hand, if for example a stability parameter indicates that a specific satellite is stable (e.g. due to a stable orbit or a stable clock of the specific satellite), it may be dynamically determined that the correction data for the specific stable satellite does not need to be transmitted to a mobile device or that it is sufficient to transmit correction data to the mobile device at an decreased transmission rate or a longer transmission interval, since an accurate position estimate may be determined without considering the presently pending correction data for the specific satellite.

Compared to for example fixed transmission characteristics for transmitting correction data, dynamically determining transmission characteristics based on the stability of a specific satellite may allow for a compromise between the amount of correction data transmitted to a mobile device and the achieved positioning accuracy. This may be advantageous in cases where for example the bandwidth for data transmission to a mobile device utilizing the correction data is limited.

According to a further exemplary aspect of the invention, an apparatus is disclosed, wherein the apparatus comprises means for performing the steps of any one embodiment of the above disclosed method or a part thereof (e.g. at least some steps of any one embodiment of the disclosed method).

The means of the disclosed apparatus can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chipset or a chip, like an integrated circuit. The disclosed apparatus may comprise a single means for all functions, a common plurality of means for all functions, or a plurality of different means for different functions.

For example, the disclosed apparatus may be a mobile communication device, a smartphone, a navigation device (such as a GNSS receiver), a camera, a device comprising a camera, a mobile computing device, or a laptop, etc. It could be a handheld device or a device that is meant to be integrated into a larger mobile entity, for instance a navigation device that is integrated into a vehicle. The disclosed apparatus could also be a stationary device, which is configured to operate only when stationary. An example of a stationary device may be a server, such as for example a server providing correction data for the purpose of assisting positioning services or a server that is operatively connected to another server providing correction data for the purpose of assisting positioning services. Therein, a server as example of the disclosed apparatus may be part of a plurality of servers (e.g. forming a positioning cloud) or may be represented by such a plurality of servers (e.g. forming a positioning cloud).

The disclosed apparatus could equally be a component, like a chip, circuitry on a chip or a plug-in board, for any mobile or stationary device. Optionally, the at least one apparatus could comprise various other components, like a camera, a data interface configured to enable an exchange of data with a server or any other device, a mobile device, a user interface like a touchscreen, a further memory, a further processor, etc.

According to a further exemplary aspect of the invention, a system is disclosed which comprises at least one of (1) the disclosed apparatus(es) (e.g. a mobile device or a server), (2) a server if for example the disclosed apparatus is a mobile device or a mobile device if for example the disclosed apparatus is a server and (3) optionally a remote server providing correction data and/or one or more satellites.

According to a further exemplary aspect of the invention, a non-transitory computer readable storage medium is disclosed, in which computer program code is stored. The computer program code causes an apparatus to perform any one embodiment of the above disclosed method (e.g. the steps of any one embodiment of the disclosed method) when executed by a processor or by a plurality of processors. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

According to a further exemplary aspect of the invention, a computer program code is disclosed, the computer program code when executed by a processor (or by a plurality of processors) causing an apparatus to perform any one embodiment of the disclosed method (e.g. the steps of any one embodiment of the disclosed method).

The disclosed method, apparatus(es), system, non-transitory computer readable storage medium and computer program code may be for determining transmission characteristics for transmitting correction data for a specific satellite.

In the following, further features and embodiments of these exemplary aspects of the invention will be described.

According to an exemplary embodiment of the invention, the method further comprises:
 causing of transmitting, at least partially based on the one or more transmission characteristics for transmitting correction data for the specific satellite, the correction data for the specific satellite.

Transmitting the correction data for the specific satellite at least partially based on the one or more transmission characteristics for transmitting correction data for the specific satellite may be understood to mean that the transmitting at least partially depends on the one or more transmission characteristics. For example, if the one or more transmission characteristics comprise a transmission indicator indicating that correction data for a specific satellite are to be transmitted, transmitting the correction data for the specific satellite is caused. In another example, if the one or more transmission characteristics comprise a transmission rate or a transmission interval, the correction data and subsequent correction data may be transmitted according to for example a transmission rate included in the one or more transmission characteristics (e.g. 1 transmission per 60 seconds or 10 transmissions per 60 seconds) or according to a transmission interval included in the one or more transmission characteristics (e.g. 60 seconds between two successive transmission events or 10 seconds between two successive transmission events).

For example, if the at least one performing apparatus is a server, causing of transmitting correction data may at least comprise causing of sending, at least partially based on the one or more transmission characteristics, the correction data for the specific satellite to at least one mobile device (e.g. a GNSS receiver), at which the received correction data may be utilized when determining a position estimate of the mobile device's position. In another example, if the at least one performing apparatus is a mobile device (e.g. a mobile device at which the correction data are to be utilized), causing of transmitting correction data may at least comprise requesting of transmitting, at a remote server (e.g. a remote server providing the correction data), the correction data for the specific satellite such that the correction data may be received by the mobile device performing the method disclosed above.

According to an exemplary embodiment of the invention, the specific satellite is a satellite of a satellite navigation system, in particular of one of
 the NAVSTAR GPS navigation satellite system;
 the GLONASS navigation satellite system;
 the GALILEO navigation satellite system;
 the BeiDou navigation satellite system;
 the IRNSS navigation satellite system;
 the QZSS navigation satellite system.

The NAVSTAR GPS navigation satellite system is a global navigation satellite system developed by the U.S. Department of Defense under its NAVSTAR satellite program. Further information on the NAVSTAR GPS navigation satellite system is presently available under https://www.gps.gov/.

The GLONASS navigation satellite system is a global navigation satellite system placed in orbit by the former Soviet Union, and since then has been maintained by the Russian Republic. Further information on the GLONASS navigation satellite system is presently available under www.glonass-svoevp.ru/.

The GALILEO navigation satellite system is a global navigation satellite system designed by the European Commission's Galileo Signal Task Force (STF), which was established by the European Commission (EC). Further information on the GALILEO navigation satellite system is presently available under https://galileognss.eu/.

The BeiDou navigation satellite system is a global navigation satellite system operated by the China National Space Administration (CNSA). Further information on the BeiDou navigation satellite system is presently available under http://www.beidou.gov.cn/.

The IRNSS navigation satellite system with an operational name of NavIC (acronym for Navigation with Indian Constellation) is a regional navigation satellite system developed by the Indian Space Research Organisation (ISRO). Further information on the IRNSS navigation satellite system is presently available under https://www.isro.gov.in/imss-programme/.

The QZSS navigation satellite system, also known as Michibiki, is a regional time transfer system and a satellite-based augmentation system developed by the Japanese government to enhance the United States-operated NAVSTAR GPS navigation satellite system in the Asia-Oceania regions, with a focus on Japan. Further information on the IRNSS navigation satellite system is presently available under https://qzss.go.jp/en/.

The above mentioned navigation satellite systems may be similar in their basic operation for positioning purposes, but some differences may exist, for example with respect to the design and content of satellite positioning signals transmitted by satellites belonging to the respective navigation satellite system (e.g. regarding a design of a navigation message conveyed by a satellite positioning signal).

According to an exemplary embodiment of the invention, the one or more stability parameters for the specific satellite comprise one or more of:
 a clock stability parameter indicative of a stability of a clock of the specific satellite; or
 an orbit stability parameter indicative of a stability of an orbit of the specific satellite.

For example, a clock stability parameter that is indicative of a stability of a clock of the specific satellite may indicate whether a clock of the specific satellite is stable or unstable. Additionally or alternatively, a clock stability parameter may indicate a degree of stability of a clock of the specific satellite. For example, a less stable clock of the satellite may be indicated by a larger or smaller value (e.g. a numerical value) of a clock stability parameter. In other examples, a change in a value (e.g. a numerical or a Boolean value) of a stability parameter over time may indicate a stability of a clock of the specific satellite, which may be understood to mean that a constant numerical or boolean value of a clock stability parameter over time may indicate a stable clock of a specific satellite, while a change in a numerical or boolean value of a stability parameter over time may indicate an unstable clock of the satellite.

In one example, a clock stability parameter for a specific satellite may be related to a difference between a timescale of the satellite clock of the specific satellite and a system timescale at a given time determined partially based on (1) signal timing data conveyed by a satellite positioning signal transmitted by the specific satellite and (2) a clock model for the specific satellite as further described below. For example, this difference in timescales may be determined for each given time of several given times (e.g. time points within a predetermined time period), which enables determining a change in the difference over time (e.g. the temporal evolution of the difference). Therein, a clock stability parameter may be indicative of (e.g. may be given by) a change over time of the difference.

In a similar manner, an orbit stability parameter that is indicative of a stability of an orbit of the specific satellite may indicate whether an orbit of the specific satellite is stable or unstable. Additionally or alternatively, an orbit clock stability parameter may indicate a degree of stability of an orbit of the specific satellite. For example, a less stable orbit of the satellite may be indicated by a larger or smaller value (e.g. a numerical value) of an orbit stability parameter. In other examples, a change in a value (e.g. a numerical or a Boolean value) of an orbit stability parameter over time may indicate a stability of an orbit of the specific satellite, which may be understood to mean that a constant numerical or boolean value of an orbit stability parameter over time may indicate a stable orbit of a specific satellite, while a change in a numerical or boolean value of a stability parameter over time may indicate an unstable orbit of the satellite.

In one example, an orbit stability parameter for a specific satellite may be related to a difference between an orbital position for a specific satellite determined partially based on (1) satellite ephemeris data conveyed by a satellite positioning signal transmitted by the specific satellite and (2) an orbit model for the specific satellite, e.g. as further described below. For example, this difference in orbital position may be determined for each given time of several given times (e.g. time points within a predetermined time period), which enables determining a change in the difference over time (e.g. the temporal evolution of the difference). Therein, an orbit stability parameter may be indicative of (e.g. may be given by) a change over time of the difference It may be advantageous to distinguish between a clock stability parameter and an orbit stability parameter as disclosed above, because in some examples it may occur that an orbit of a specific satellite is stable at a given time while a clock of the specific satellite is unstable at the same given time (or vice versa). In other examples, a degree of stability of a clock of a specific satellite indicated by a clock stability parameter for the specific satellite at a given time may be different from a degree of stability of an orbit of the specific satellite indicated by an orbit stability parameter for the specific satellite at the same given time. In such a case, a value (e.g. a numerical value) of a clock stability parameter of a specific satellite may be larger or smaller than a value (e.g. a numerical value) of an orbit stability parameter for the specific satellite. In such cases, handling a clock stability parameter and an orbit stability parameter separately may for example allow for determining more appropriate transmission characteristics, if for example an unstable clock of a specific satellite requires correction data.

However, it is to be understood that at least in some cases a clock stability parameter and an orbit stability parameter of a specific satellite cannot be considered as separate quantities, since events that may cause an unstable orbit of a specific satellite may likewise cause an unstable clock of the specific satellite (e.g. a sudden change in solar radiation pressure when the specific satellite is entering or leaving the Earth's shadow).

According to an exemplary embodiment of the invention, determining the one or more stability parameters for the specific satellite at least partially depends on at least one of:
 an orbit model for the specific satellite;
 a clock model for the specific satellite; or
 correction data for the specific satellite.

For example, determining the one or more stability parameters for the specific satellite may at least partially depend on an orbit model for the specific satellite, which may be understood to mean that the one or more stability parameters are determined at least partially based on an orbit model for the specific satellite. An orbit model for a specific satellite may represent the orbit of the specific satellite at a given time, such that an orbital position or velocity of the specific satellite at a given time may be determined at least partially based on the orbit model.

In one example, an orbit model representing the orbit of a specific satellite may be at least partially based on one or more forces that affect the specific satellite at a given time. For example, the orbit model may be given by an equation of motion based on a two body problem considering the masses of the specific satellite and the Earth. In such a case, one or more forces affecting the specific satellite and thus perturbating the motion of the specific satellite may be added as additional contribution (e.g. as perturbing forces per unit mass) to the equation of motion. Therein, forces affecting the specific satellite may for example relate to solar radiation pressure, earth radiation pressure, non-sphericity of the Earth, ocean tides, general relativity or other effects. The effect of such forces on the specific satellite may at least in some examples depend on time and/or depend on the orbital position of the specific satellite and thus change over time (e.g. during a limited period of time).

For example by representing an orbit of the specific satellite at a given time, an orbit model for the specific satellite may enable determining an orbital position (e.g. predicting or estimating a true orbital position) of the specific satellite at a given time and/or during a given time period and thus may enable determining one or more stability parameter for the specific satellite (e.g. an orbit stability parameter for the specific satellite). For example, an orbit model may comprise a set of orbit model parameters that enable determining a position or velocity of the specific satellite at a given time. For example based on time-dependent and/or position-dependent forces affecting the specific satellite as described above, a temporal evolution in the orbit model parameters of the orbit model may be determined. In this example, the determined temporal evolution in orbit model parameters may serve as basis for determining one or more stability parameters (e.g. an orbit stability parameter for the specific satellite). For example, based on a large change over time in values of orbital parameters, a large value (e.g. a numerical value) of a stability parameter may be determined.

In another example, considering for example that the method disclosed above may be performed by a mobile device that receives a satellite positioning signal from a specific satellite, the orbital position of the specific satellite at several given times may be determined partially based on (1) satellite ephemeris data conveyed by the satellite positioning signal and (2) the orbit model for the specific satellite. Therein, for example an estimation or prediction of a true orbital position of the specific satellite a given time may be determined based on the orbit model for the specific satellite. At least partially based on a temporal evolution of a difference in the orbital positions determined according to (1) and (2) at the several given times, a stability parameter (e.g. an orbit stability parameter) may be determined. For example, a stability parameter may be given by a change (e.g. an increase or decrease) over time in difference between the two orbital positions determined according to (1) and (2). If for example this change over time as stability parameter may be too large (e.g. larger than a predetermined stability threshold), this may indicate that the specific satellite's orbit may be unstable and that new correction data at a mobile device determining a position estimate may be necessary for determining an accurate position estimate.

Using an orbit model for a specific satellite as basis when determining one or more stability parameters for the specific satellite as described exemplarily in the examples above may be advantageous, because an orbit model may help to determine when changes in an orbit of the specific satellite over time may render the specific satellite's orbit unstable and thus when new correction data for the specific satellite are required for determining an accurate position estimate.

In another example, determining the one more stability parameters for the specific satellite may at least partially depend on a clock model for the specific satellite, which may be understood to mean that the one or more stability parameters are determined at least partially based on a clock model for the specific satellite.

As disclosed above, a clock model may for example represent a difference between a timescale of the satellite clock and a system timescale at a given time (e.g. an emission time of a satellite positioning signal). Based on a change over time in this difference which may result from the oscillatory period of the satellite clock changing over time (e.g. due to radiation exposure, temperature variation, aging, relativistic effects affecting the satellite clock) and which may be captured by the clock model, the clock model may enable determining a corresponding stability parameter. For example, a clock model may comprise a set of clock model parameters that enable determining a difference between a timescale of the satellite clock of the specific satellite and a system timescale at a given time. For example, a temporal evolution in the clock model parameters may serve as basis for determining one or more stability parameters (e.g. a clock stability parameter for the specific satellite). For example, based on a large change over time in values of clock model parameters, a large value (e.g. a numerical value) of a stability parameter (e.g. a clock stability parameter for the specific satellite) may be determined.

In another example, considering for example that the method disclosed above may be performed by a mobile device that receives a satellite positioning signal from a specific satellite, the difference between a timescale of the satellite clock of the specific satellite and a system timescale at several given times may be determined partially based on (1) signal timing data conveyed by the satellite positioning signal and (2) the clock model for the specific satellite. In one example, at least partially based on the clock model parameters determined according to (1) and (2), a stability parameter (e.g. a clock stability parameter) may be determined. For example, a stability parameter may be given by a change over time in the difference between a timescale of the satellite clock of the specific satellite and a system timescale at a given time determined according to (1) and (2). If for example this change over time as stability parameter may be too large (e.g. larger than a predetermined stability threshold), this may indicate that the specific satellite's clock may be unstable and that new correction data at a mobile device determining a position estimate may be necessary for determining an accurate position estimate.

Using a clock model for a specific satellite as basis when determining one or more stability parameters for the specific satellite as described exemplarily in the examples above may be advantageous, because a clock model may help to determine when changes in the oscillatory period of the clock's oscillator over time may render the specific satellite's clock unstable and thus when new correction data for the specific satellite are required for determining an accurate position estimate.

In another example, the determining a stability parameter for a specific satellite may at least partially depend on (e.g. previous) correction data for the specific satellite. As disclosed above, correction data for a specific satellite may be utilized by a mobile device for increasing the accuracy of a position estimate and may comprise at least orbital correction parameters and/or clock correction parameters. For example, orbital correction parameters may represent a difference between the true orbital position and the determined orbital position of the specific satellite, wherein the difference may be represented in a specific coordinate system. Considering for example orbital correction parameters representing respective differences between a determined and true orbital position in an along track component, a cross track component and a radial component, a stability parameter (e.g. an orbit stability parameter) may be related to a difference (e.g. a change over time in this difference) in at least one of these components.

In one example, an apparatus performing the method disclosed above may hold available pending as well as previous correction data for a specific satellite. In such a case, a stability parameter (e.g. an orbit stability parameter) for the specific satellite may be determined based on pending and previous correction data for the specific satellite. A stability parameter for a specific satellite may then be determined based on the temporal evolution (e.g. a change over time) of the respective orbital correction parameters included in pending and previous correction data for the specific satellite. For example, a stability parameter for a specific satellite may be determined as a temporal evolution (e.g. a change over time) in at least one of the above mentioned components as represented by respective orbital correction parameters included in pending and previous correction data for the specific satellite.

In another example, an apparatus performing the method disclosed above may hold available no pending correction data but several previous correction data for a specific satellite (e.g. a mobile device that has not yet received the pending correction for a specific satellite data but several previous correction data for the specific satellite). In such a case, a stability parameter (e.g. an orbit stability parameter) for the specific satellite may be determined based on the several previous correction data for the specific satellite. A stability parameter for a specific satellite may then be determined based on the temporal evolution of the respective orbital correction parameters included in several previous correction data for the specific satellite. For example, a stability parameter for a specific satellite may be determined as a temporal evolution (e.g. a change over time) in at least one of the above mentioned components as represented by respective orbital correction parameters included in the several previous correction data for the specific satellite.

Considering examples above for determining one or more stability parameters for a specific satellite at least partially based on an orbit model for a specific satellite, on a clock model for a specific satellite or on correction data for a specific satellite, it is to be understood that any combination of such examples may be conceivable for determining one or more stability parameters. Determining a stability parameter for a specific satellite based on both correction data as well as orbit and/or clock modelling for the specific satellite may be advantageous, because it may yield a particularly meaningful stability parameter for the specific satellite. For example, correction data for a specific satellite may be used as input for a Kalman Filter, wherein the Kalman Filter may be constructed to estimate a reliability of the input correction data for the specific satellite. Therein, at least one of an orbit model for the specific satellite, a clock model for the specific satellite and correction data for the specific satellite may be used to create a process model in the Kalman Filter. For example, a stability parameter may then be given by an estimation result from the Kalman Filter (e.g. a stability parameter may be derived from a covariance matrix of a Kalman Filter output).

According to an exemplary embodiment of the invention, determining the one or more stability parameters for the specific satellite at least partially depends on correction data for the specific satellite and/or at least one of an orbit model for the specific satellite or a clock model for the specific satellite, wherein the one or more stability parameters are determined by applying a filter method (e.g. a Kalman Filter method, an extended Kalman Filter method, an unscented Kalman Filter method or a particle filter method) to correction data for the specific satellite and/or at least one of an orbit model for the specific satellite or a clock model for the specific satellite.

According to an exemplary embodiment of the invention, determining the one or more stability parameters for the specific satellite at least partially depends on correction data for the specific satellite and at least one of an orbit model for the specific satellite or a clock model for the specific satellite, wherein the one or more stability parameters are determined at least partially based on an estimation result from a Kalman Filter (e.g. a stability parameter may be derived from a covariance matrix of a Kalman Filter output), wherein the correction data for the specific satellite are used as input for the Kalman Filter and at least one of an orbit model for the specific satellite and a clock model for the specific satellite are used to create a process model in the Kalman Filter.

According to an exemplary embodiment of the invention, the one or more transmission characteristics for transmitting correction data for the specific satellite comprise one or more of the following or information on one or more of the following:

an identifier of the specific satellite;
a transmission indicator;
a transmission time
a transmission rate;
a transmission interval; or
a transmission pattern.

An identifier of the specific satellite may for example be any piece of information included in the one or more transmission characteristics that enables identifying the specific satellite for which the correction data are to be transmitted. For example, the identifier may be a serial number assigned to the specific satellite.

A transmission indicator may for example be a piece of information included in the one or more transmission characteristics that indicates whether or not the correction data are to be transmitted. For example, a transmission indicator may be of a data type that has one of two possible values (e.g. a Boolean data type). A transmission time may for example be a piece of information included in the one or more transmission characteristics that indicates at which time (e.g. a time in a system timescale of a navigation satellite system) the correction data are to be transmitted.

A transmission rate included in the one or more transmission characteristics may for example be understood as a number of transmission events per time unit (e.g. 1 transmission event per 60 seconds or 10 transmission events per 60 seconds). Similarly, a transmission interval included in the one or more transmission characteristics may for example be understood as a time period between two successive transmission events (e.g. 60 seconds between two transmission events or 10 seconds between two transmission events). A transmission pattern included in the one or more transmission characteristics may for example be understood as a list of transmission times at which respective correction data are to be transmitted. According to these example for a transmission rate, transmission interval or transmission pattern, transmission of correction data is to be understood as repeating event, since after correction data have been transmitted to a mobile device, further (e.g. newer) correction data may be held available (e.g. by a server) as subsequent correction data. In such a case, successive correction data may be transmitted repeatedly according to a transmission rate, transmission interval or transmission pattern included in the one or more transmission characteristics.

According to an exemplary embodiment of the invention, determining the one or more stability parameters for the specific satellite at least partially depends on the correction data for the specific satellite.

As disclosed above, an apparatus performing the method disclosed above may hold available as well as previous correction data for a specific satellite. In such a case, a stability parameter (e.g. an orbit stability parameter) for the specific satellite may be determined at least partially based on pending and for example additionally previous correction data for the specific satellite as disclosed above. This may not be the case if for example the apparatus performing the method disclosed above may be a mobile device that has not yet received the pending correction for a specific satellite data but several previous correction data for the specific satellite.

According to an exemplary embodiment of the invention, the causing of transmitting the correction data for the specific satellite further comprises:

causing of sending, at least partially based on the one or more transmission characteristics for transmitting correction data for the specific satellite, the correction data for the specific satellite to at least one mobile device of a plurality of mobile devices.

Further considering that for example the at least one apparatus performing the method disclosed above may be a server (and e.g. not a mobile device for whose position a position estimate is to be determined), causing of transmitting correction data may at least comprise causing of sending, at least partially based on the one or more transmission characteristics, the correction data for the specific satellite to at least one mobile device of a plurality of mobile devices (e.g. a GNSS receiver), at which the received correction data may be utilized when determining a position estimate of the mobile device's position.

Considering the example of a server being the at least one apparatus performing the method disclosed above, the server may also hold available the correction data to be transmitted. In such a case, causing of sending may be understood to mean that for example the server may cause sending the correction data by means of a communication interface of the server. Alternatively, the correction data may not be held available by the server performing the above disclosed method but by another, remote server. In such a case, causing of sending may be understood to mean that for example the server performing the above disclosed method may send the determined one or more transmission characteristics to the remote server holding available the correction data and the remote server subsequently may send the correction data (e.g. to a mobile device) at least partially based on the one or more transmission characteristics.

According to an exemplary embodiment of the invention, a position estimate of a position of the at least one mobile device is determined at least partially based on the sent correction data for the specific satellite and a satellite positioning signal received from each satellite of a plurality of satellites, wherein the plurality of satellites includes the specific satellite.

Further considering that for example the at least one apparatus performing the method disclosed above may be a server (and e.g. not a mobile device for whose position a position estimate is to be determined), the server may cause sending, at least partially based on the one or more transmission characteristics for transmitting correction data for the specific satellite, the correction data for the specific satellite to at least one mobile device of a plurality of mobile devices. At the at least one mobile device that receives the correction data for the specific satellite sent by the server, a position estimate of a position of the at least one mobile device may be determined at least partially based on the sent correction data for the specific satellite and one or more satellite positioning signals received from each satellite of a plurality of satellites, wherein the plurality of satellites include the specific satellite. Thus, by utilizing the transmitted correction data for the specific satellite, the accuracy of the determined position estimate for the mobile device's position may for example be increased despite an instability of the specific satellite.

According to an exemplary embodiment of the invention, the method disclosed above is performed for the specific satellite and for at least one further specific satellite and wherein the causing of transmitting correction data for the specific satellite and the causing of transmitting correction data for the at least one further specific satellite further comprises:

assembling, at least partially based on the one or more transmission characteristics for transmitting correction data for the specific satellite and the one or more transmission characteristics for transmitting correction data for the at least one further specific satellite, the correction data for the specific satellite and the correction data for the at least one further specific satellite; and causing of sending, at least partially based on the one or more transmission characteristics for transmitting correction data for the specific satellite and the one or more transmission characteristics for transmitting correction data for the at least one further specific satellite, the assembled correction data for the specific satellite and correction data for the at least one further specific satellite to the at least one mobile device of the plurality of mobile devices.

In particular, the above disclosed step of assembling the correction data for the specific satellite and the correction data for the at least one further specific satellite and the step of causing of sending the assembled correction data may be performed when for example the at least one apparatus performing the method disclosed above may be a server (and e.g. not a mobile device for whose position a position estimate is to be determined), For example, the method disclosed above may be performed for the specific satellite and for at least one further specific satellite. Therein, the respective one or more transmission characteristics for transmitting respective correction for each of the specific satellite and the at least one further specific satellite may be determined based on one or more stability parameters for each of the specific satellite and the at least one further specific satellite.

Instead of transmitting respective correction data for each specific satellite individually to a mobile device (e.g. a mobile device at which correction data for each the specific satellite and the at least one further specific satellite are to be utilized for determining a position estimate), it may be more effective to assemble (e.g. group) the correction data for the specific satellite and the correction data for the at least one further specific satellite and send the assembled correction data by one single transmission event instead of two individual transmission events to the mobile device. Therein, the assembling and sending may at least partially based on the respective one or more transmission characteristics. For example, if for each correction data the same or at least similar transmission characteristics (e.g. the same transmission rate) have been determined, the respective correction data may be grouped and sent together according to the same transmission characteristics (e.g. the same transmission rate).

According to an exemplary embodiment of the invention, the causing of transmitting further comprises:

requesting of transmitting, at a remote server, at least partially based on the one or more transmission characteristics for transmitting correction data for the specific satellite, the correction data for the specific satellite; and receiving the correction data for the specific satellite from the remote server.

As disclosed above, if for example the at least one performing apparatus is a mobile device (e.g. a mobile device at which the correction data are to be utilized), causing of transmitting correction data may at least comprise requesting of transmitting, at a remote server, the correction data for the specific satellite such that the correction data may be received by the mobile device performing the method disclosed above from the remote server. Therein, the remote server may be a server that provides the correction data for the specific satellite.

For example, requesting of transmitting, at a remote server, at least partially based on the one or more transmission characteristics for transmitting correction data for the specific satellite, the correction data for the specific satellite may be understood as sending a request (e.g. a request message) at least partially based on the one or more transmission characteristics to the remote server, whereafter the remote server responses to the request by sending correction data for the specific satellite. Therein, the request may for example comprise the one or more transmission characteristics (e.g. a request message may comprise the one or more transmission characteristics) and sending correction data may for example at least partially depend on the one or more transmission characteristics included in the request.

According to an exemplary embodiment of the invention, the method further comprises:

receiving a satellite positioning signal from each satellite of a plurality of satellites, wherein the plurality of satellites includes the specific satellite, and determining a position estimate at least partially based on the received correction data for the specific satellite and the received satellite positioning signal from each satellite.

Further considering that for example the at least one apparatus performing the method disclosed above may be a mobile device (e.g. a mobile device at which the correction data are to be utilized), the mobile device may for example receive a satellite positioning signal from each satellite of a plurality of satellites, wherein the plurality of satellites includes the specific satellite. In such an example, determining a position estimate may be at least partially based on these received satellite signals and additionally based on the received correction data. Thus, by utilizing the transmitted correction data for the specific satellite, the accuracy of the determined positioning for the mobile device's may for example be increased despite an instability of the specific satellite.

According to an exemplary embodiment of the invention, the at least one apparatus performing the method is a mobile device. According to another exemplary embodiment of the invention, the at least one apparatus performing the method is a server.

It is to be understood that for example the above disclosed method steps of obtaining or determining one or more stability parameters for a specific satellite, determining, at least partially based on the one or more stability parameters for the specific satellite, one or more transmission characteristics for transmitting correction data for the specific satellite and causing of transmitting, at least partially based on the one or more transmission characteristics for transmitting correction data for the specific satellite, the correction data for the specific satellite may be performed by a mobile device (e.g. a mobile device, for whose position a position estimate is to be determined) or a stationary device (e.g. a server). If for example a mobile device is the performing entity, causing of transmitting may comprise requesting of transmitting correction data for the specific satellite at a remote sever, receiving the correction data for the specific satellite from the remote server and determining a position estimate at least partially based on the correction data. If in another example a stationary device (e.g. a server) is the performing entity, causing of transmitting may comprise causing of sending the correction data to at least one mobile device of a plurality of mobile devices, at which the correction data are for example received and utilizes for determining a position estimate.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

The following description serves to deepen the understanding of the present invention and shall be understood to complement and be read together with the description of example embodiments of the invention as provided in the above SUMMARY section of this specification.

Figure 1:
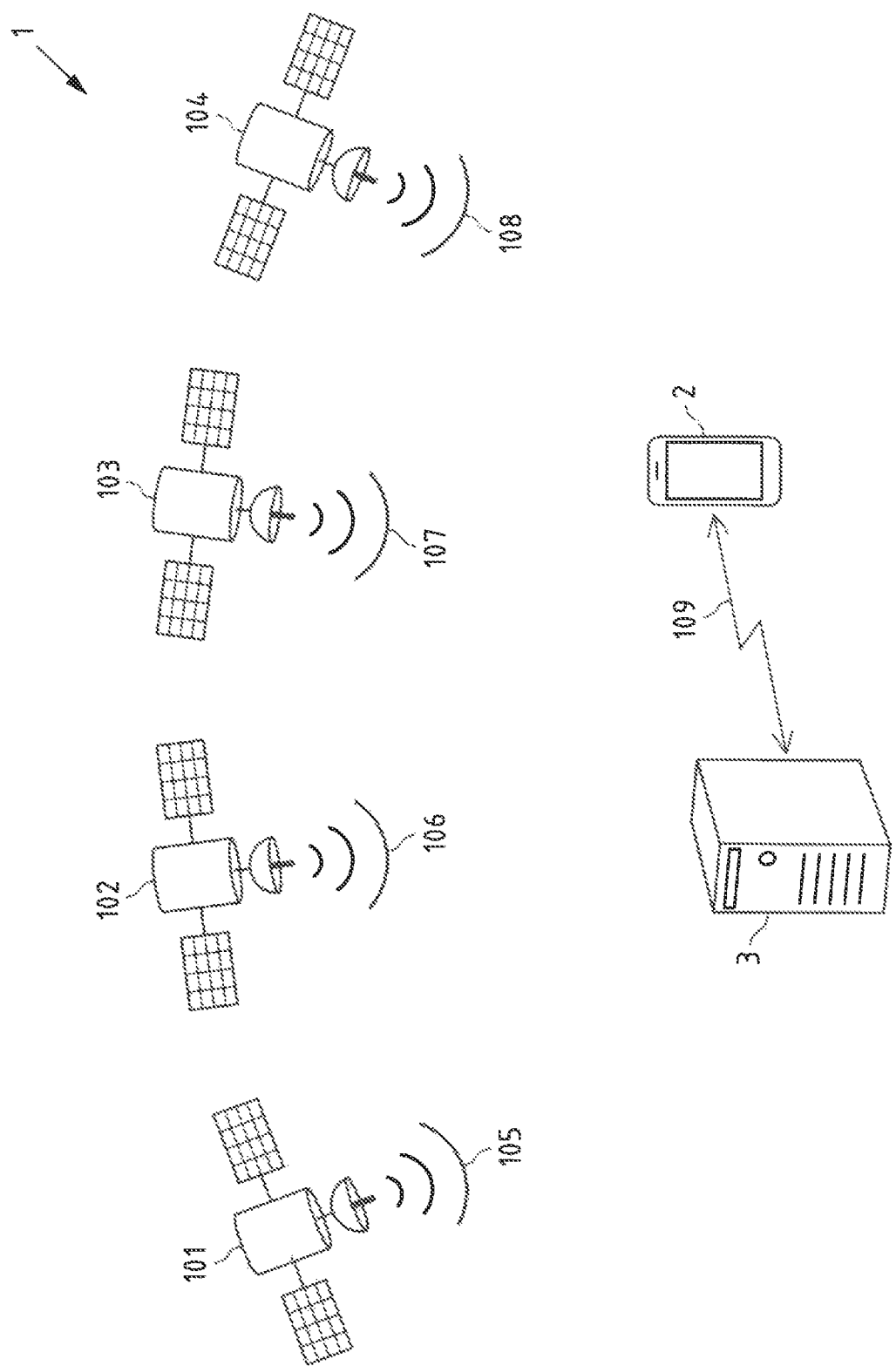
FIG. 1 is a block diagram of an exemplary embodiment of a system according to the invention.

FIG. 1 is a schematic high-level block diagram of a system 1 according to an exemplary aspect of the invention. Without limiting the scope of the invention, it is assumed in the following that system 1 is part of a Global Navigation Satellite System (GNSS) based positioning solution.

For illustrative purposes, FIG. 1 shows four satellites 101 to 104 of a GNSS system like the Galileo system or the GPS system. Each satellite of satellites 101 to 104 (e.g. periodically or repeatedly or continuously) sends (e.g. broadcasts) a respective satellite positioning signal of satellite positioning signals 105 to 108 conveying a respective message containing at least respective satellite ephemeris data and signal timing data. An example of such a message is a Galileo F/NAV message as specified by the Galileo open service specifications or a GPS navigation message as specified by the GPS specifications. Accordingly, satellite ephemeris data may represent or contain a set of ephemeris parameters as specified by the Galileo open service specifications or the GPS specifications and the signal timing data may represent or contain a set of clock offset parameters as specified by Galileo open service specifications or the GPS specifications.

In the following, it is assumed that the respective satellite ephemeris data enable determining an orbital position of the respective satellite at a given time and that the respective signal timing data enable determining a pseudorange between the respective satellite sending the respective satellite positioning signal and a mobile device (e.g. the mobile device 2 disclosed below) receiving the satellite positioning signal. Therein, determining the pseudorange may be partially based on an emission time of the respective satellite positioning signal in a timescale of a clock carried by the respective satellite and a reception time of the respective satellite positioning signal in a timescale of a clock carried by the mobile device (e.g. the mobile device 2 disclosed below).

System 1 comprises a mobile device 2 and a server 3. Server 3 and mobile device 2 may communicate with each other via communication path 109. Communication path 109 may be a direct or indirect communication path. For example, communication path 109 may comprise one or more hops, for example one or more communication links or communication connections. In the following, it is assumed that communication path 109 is a wireless communication connection in a cellular network like a 2G/3G/4G/5G cellular communication network. It is however to be understood that the invention is not limited to this.

Moreover, system 1 is not limited to a single server 3, but may optionally comprise a plurality of servers (e.g. forming a server cloud). Accordingly, server 3 may be part of such a plurality of servers (e.g. a server cloud) or may be represented by such a plurality of servers (e.g. a server cloud). As disclosed below in more detail, server 3 may transmit pending correction data for a specific satellite of the satellites 101 to 104 to mobile device 2 at which the pending correction data are utilized for determining a position estimate.

For example, mobile device 2 may be one of a GNSS receiver, a smart home device, a smartphone, a tablet computer, a notebook computer, a smart watch, and a smart band. Mobile device 2 may support the GNSS based positioning solution. This may be understood to mean that mobile device 2 is configured to estimate its position (e.g. determine a position estimate of its position) at least partially based on satellite positioning signals 105 to 108 observed at this position. Determining a position estimate of the position of mobile device 2 may at least partially depend on respective orbital positions of satellites 101 to 104 and respective pseudoranges between the respective satellite satellites 101 to 104 and mobile device 2 (e.g. by solving a equation system that includes the pseudoranges, clock offsets and the orbital positions). Therein, respective orbital positions are determined at least partially based on satellite ephemeris data and respective pseudoranges are determined at least partially based on signal timing data conveyed by respective satellite positioning signals 105 to 108.

As an example, it is assumed in the following that an orbit of satellite 101 as specific satellite (e.g. a gravitationally curved trajectory followed by specific satellite 101 around the Earth) changes over time, which may render the orbit unstable and thus a position estimate of the position of mobile device 2 at least partially based on satellite positioning signal 105 inaccurate. This may be due to a deviation between the orbital position of the specific satellite 101 determined at a given time (e.g. the emission time of the satellite positioning signal 105 transmitted by the specific satellite 101) at least partially based on the satellite ephemeris data conveyed by the satellite positioning signal 105 and the true orbital position of the specific satellite 101 at this given time. In order to correct for such deviation and achieve better accuracy of the position estimate, correction data for specific satellite 101 may be taken into account when determining the position estimate. For transmitting pending correction data for specific satellite 101, one or more transmission characteristics are determined at least partially based on one or more stability parameters for specific satellite 101 as disclosed in more detail below with respect to FIG. 4.

Figure 2:
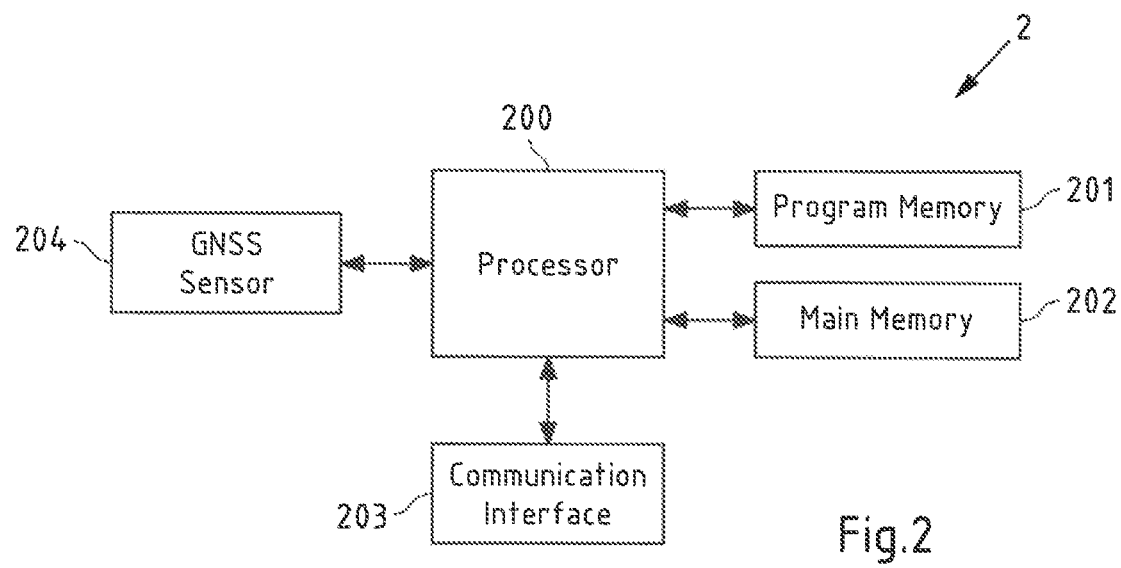
FIG. 2 is a block diagram of an exemplary embodiment of a mobile device according to the invention.

FIG. 2 is a block diagram of an exemplary embodiment of mobile device 2 according to the invention. In the following, it is assumed that mobile device 2 of FIG. 1 corresponds to this mobile device 2.

Mobile device 2 comprises a processor 200. Processor 200 may represent a single processor or two or more processors, which are for instance at least partially coupled, for instance via a bus. Processor 200 executes a computer program code stored in program memory 201 (e.g. computer program code causing mobile device 2 to perform any one embodiment of the disclosed method (e.g. the steps of any one embodiment of the disclosed method) or a part thereof (e.g. at least some steps of any one embodiment of the disclosed method) (as for instance further described below with reference to FIG. 4), when executed on processor 200), and interfaces with a main memory 202. Program memory 201 may also contain an operating system for processor 200 and further data like satellite ephemeris data, signal timing data or correction data. Some or all of memories 201 and 202 may also be included into processor 200. One of or both of memories 201 and 202 may be fixedly connected to processor 200 or at least partially removable from processor 200, for example in the form of a memory card or stick.

A program memory (e.g. program memory 201) may for example be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable, for instance in the form of a removable SD memory card.

A main memory (e.g. main memory 202) may for example be a volatile memory. It may for example be a DRAM memory, to give non-limiting example. It may for instance be used as a working memory for a processor (e.g. processor 200) when executing an operating system and/or programs.

Processor 200 further controls a wireless communication interface 203 configured for communicating via a cellular network (e.g. to transmit and receive cellular radio signals). For example, wireless communication interface 203 may be or may comprise a 2G/3G/4G/5G radio transceiver. Mobile device 2 may use wireless communication interface 203 to receive correction data for specific satellite 101 from server 3 of system 1 (e.g. via wireless communication path 109).

Moreover, processor 200 controls a GNSS sensor 204 configured for receiving satellite positioning signals (e.g. satellite positioning signals 105 to 108 broadcasted by satellites 101 to 104 of FIG. 1). GNSS sensor 204 is configured for (e.g. periodically or repeatedly) scanning for observable satellite positioning signals (e.g. satellite positioning signals 105 to 108 broadcasted respectively by satellites 101 to 104 of FIG. 1). Therein, a respective satellite positioning signal may be understood to be observable if the respective satellite positioning signal is receivable with a minimum quality (e.g. a minimum quality enabling a carrier locking and code locking of the respective observed satellite positioning signal) by GNSS sensor 204.

GNSS sensor 204 enables mobile device 2 to receive satellite ephemeris data and signal timing data contained in a message conveyed in an observed satellite positioning signal. To this end, GNSS sensor 204 may be configured for extracting the satellite ephemeris data and signal timing data from the received or observed GNSS signal. Moreover, GNSS sensor 204 enables mobile device 2 to estimate its position based on satellite positioning signals observed when scanning for satellite positioning signals at this position. For example, GNSS sensor 204 may be configured for providing processor 200 with data necessary for determining a position estimate of the position of mobile device 2. To this end, GNSS sensor 204 may be configured for determining, for each of the observed satellite positioning signals, a pseudorange between mobile device 2 and the respective satellite 101 to 104 broadcasting the respective observed satellite positioning signal 105 to 108. It is to be understood that any computer program code required for receiving and processing received satellite positioning signals may be stored in an own memory of GNSS sensor 204 and executed by an own processor of GNSS sensor 204 or it may be stored for example in program memory 201 and executed for example by processor 200.

The components 201 to 204 of mobile device 2 may for instance be connected with processor 200 by means of one or more serial and/or parallel busses.

It is to be understood that mobile device 2 may comprise various other components like a user interface for receiving user input.

Figure 3:
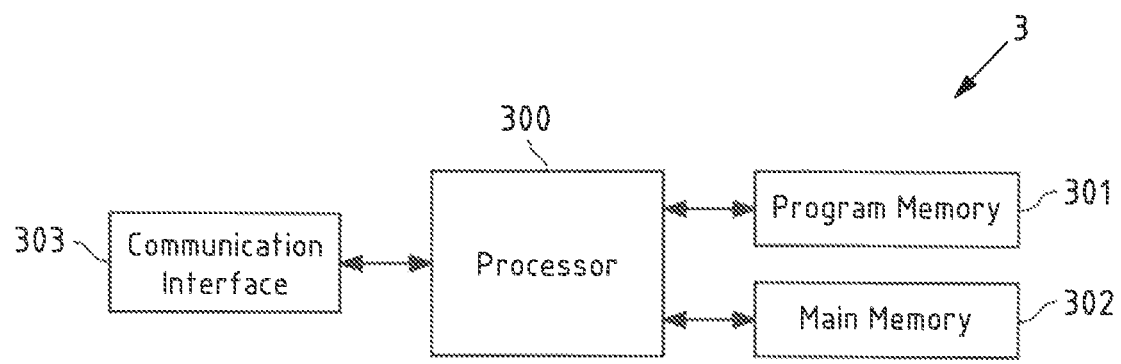
FIG. 3 is a block diagram of an exemplary embodiment of a server according to the invention.

FIG. 3 is a block diagram of an exemplary embodiment of server 3 according to the invention. In the following, it is assumed that server 3 of system 1 of FIG. 1 corresponds to this server 3.

Server 3 comprises a processor 300. Processor 300 may represent a single processor or two or more processors, which are for instance at least partially coupled, for instance via a bus. Processor 300 executes a computer program code (e.g. computer program code causing server 3 to store correction data for a specific satellite) stored in program memory 301, and interfaces with a main memory 302. Accordingly, program memory 301 may contain correction data for specific satellite 101 of satellites 101 to 104. Program memory 301 may also contain an operating system for processor 300. Some or all of memories 301 and 302 may also be included into processor 300. One of or both of memories 301 and 302 may be fixedly connected to processor 300 or at least partially removable from processor 300, for example in the form of a memory card or stick.

Processor 300 further controls a communication interface 303 which is configured to communicate via a communication network. Server 3 may use communication interface 303 to communicate with mobile device 2 of system 1. In the following, it is assumed that communication interface 303 is a wireless communication interface configured for communicating via a cellular network (e.g. to transmit and receive cellular radio signals). For example, communication interface 303 may be or may comprise a 2G/3G/4G/5G radio transceiver. For example, server 3 may use communication interface 303 to transmit correction data for specific satellite 101 of satellites 101 to 104 to mobile device 2 of system 1 (e.g. via wireless communication path 109). Moreover, server 3 may use communication interface 303 to receive correction data for specific satellite 101 from another remote server.

The components 301 to 303 of server 3 may for example be connected with processor 300 by means of one or more serial and/or parallel busses.

It is to be understood that server 3 may comprise various other components like a user interface for receiving user input.

Figure 4:
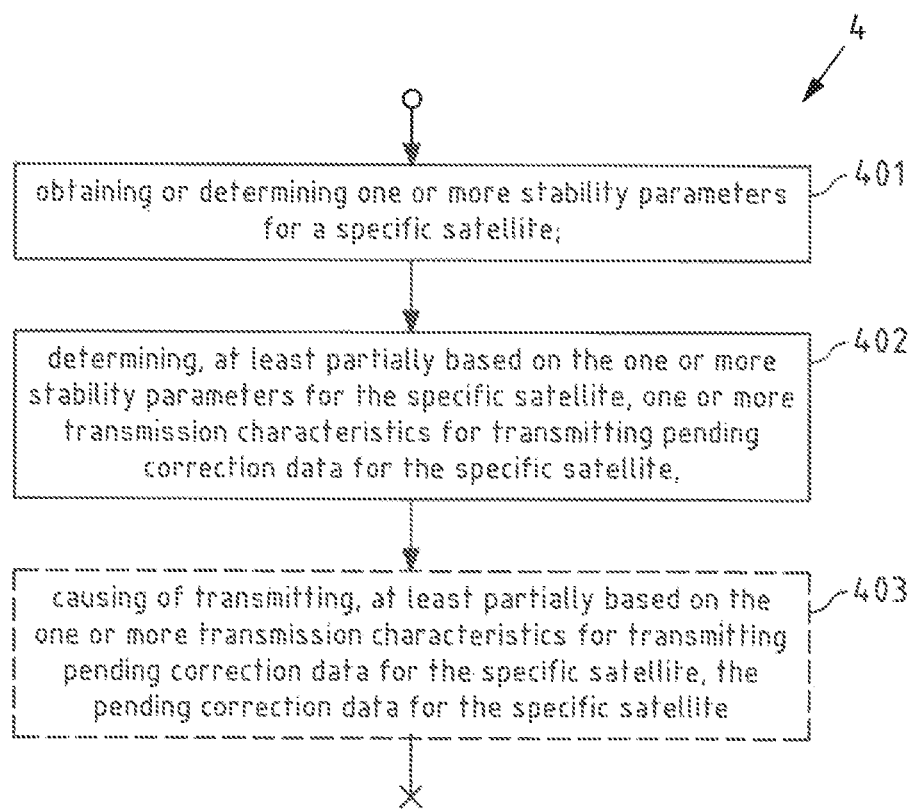
FIG. 4 is a flow chart illustrating an exemplary embodiment of a method according to the invention.

FIG. 4 is a flow chart 4 illustrating an exemplary embodiment of a method according to the invention. Without limiting the scope of the invention, it is assumed in the following that mobile device 2 or server 3 as disclosed above with respect to system 1 of FIG. 1 perform the steps of flow chart 4.

In a step 401, one or more stability parameters for a specific satellite are obtained or determined. For example, one or more stability parameter for specific satellite 101 of system 1 are obtained or determined at mobile device 2 or server 3 of system 1. Therein, an orbit of specific satellite 101 (e.g. a gravitationally curved trajectory followed by specific satellite 101 around the Earth) may change over time, which may render the orbit of specific satellite 101 unstable and thus a position estimate of the position of mobile device 2 at least partially based on satellite positioning signal 105 inaccurate. In this example, the one or more stability parameter for specific satellite 101 of system 1 (e.g. one or more orbit stability parameters) may be indicative of the instability of the orbit of specific satellite 101.

Obtained or determined on or more stability parameters for specific satellite 101 may be stored in program memory 201 or 301.

In one example, determining one or more stability parameter for specific satellite 101 of system 1 in step 401 may depend on correction data for specific satellite 101. Correction data for specific satellite 101 may be utilized by mobile device 2 for increasing the accuracy of a position estimate despite an instability of specific satellite 101. The one or more stability parameter obtained or determined in step 401 may comprise at least orbital correction parameters that represent a difference between the true orbital position of specific satellite 101 at a given time (e.g. the emission time of satellite positioning signal 105) and an orbital position of specific satellite 101 determined at least partially based on satellite ephemeris data conveyed by satellite positioning signal 105 at this given time. Therein, the difference may be represented by an along track component, a cross track component and a radial component (e.g. for each component, respective orbital correction parameters may be coefficients of a polynomial function of time).

It is to be understood that correction data for specific satellite 101 may contain or represent a validity time of the correction data, which may be valid for a predetermined time period before and after such a reference time. In the following, without limiting the scope of the invention, correction data for specific satellite 101 that are valid at a time at which the steps of flow chart 4 are performed are termed current correction data for specific satellite 101, while correction data for specific satellite 101 of an earlier validity time than current correction data are termed previous (e.g. historic) correction data for specific satellite 101. It is further assumed that correction data (e.g. current correction data) for specific satellite 101 need to be transmitted to mobile device 2 in order to be utilized by mobile device 2 when determining a position estimate. Therein, correction data (e.g. current correction data) for specific satellite 101 that are not yet transmitted to mobile device 2 are termed pending correction data for specific satellite 101, which pending correction data are for example held available by server 3 in system 1 from which the correction data are to be transmitted to mobile device 2 (e.g. by storing pending correction data in program memory 301 of server 3 at least until the pending correction data are transmitted to mobile device 2).

Considering the example of determining one or more stability parameter for specific satellite 101 of system 1 in step 401 depending on correction data for specific satellite 101, a stability parameter (e.g. an orbit stability parameter) may be determined in step 401 as a temporal evolution (e.g. a change over time) in at least one of the above mentioned components (along track, cross track, radial components) as represented by respective orbital correction parameters included in several previous and/or pending correction data for specific satellite 101.

Assuming that for example mobile device 2 of system 1 (which e.g. may not hold available pending correction data for specific satellite 101) performs determining the stability parameter in step 401, a stability parameter may then be determined as a temporal evolution (e.g. a change over time) in at least one of the above mentioned components (along track, cross track, radial components) as represented by (1) respective orbital correction parameters included in previous correction data for specific satellite 101 that may be stored in program memory 201 and (2) respective orbital correction parameters included in further (e.g. successive) previous correction data for specific satellite 101 that may be stored in program memory 201.

Assuming that for example server 3 of system 1 (which e.g. may hold available pending correction data for specific satellite 101) performs determining the stability parameter in step 401, a stability parameter may then be determined as a temporal evolution (e.g. a change over time) in at least one of the above mentioned components as represented by (1) respective orbital correction parameters included in previous correction data for specific satellite 101 and (2) respective orbital correction parameters included in pending correction data for specific satellite 101 held available at server 3.

While it is assumed above that mobile device 2 or server 3 of system 1 determine one or more stability parameter for specific satellite 101, it is to be understood that additionally or alternatively, one or more stability parameters for specific satellite 101 may be determined by another apparatus (e.g. an another apparatus of system 1) and subsequently obtained by mobile device 2 or server 3 from this apparatus via a corresponding communication path.

In a step 402, one or more transmission characteristics for transmitting pending correction data for the specific satellite are determined, at least partially based on the one or more stability parameters for the specific satellite. For example, one or more transmission characteristics are determined for transmitting pending correction data for specific satellite 101, at least partially based on the one or more stability parameters determined or obtained in step 401.

Considering the example of a stability parameter determined in step 401 that is indicative of an unstable orbit of specific satellite 101, the stability parameter may be determined as a temporal evolution (e.g. a change over time) in at least one of the above mentioned components (along track, cross track, radial components) as represented by respective orbital correction parameters included in several previous and/or pending correction data for specific satellite 101. In an example for step 402, it may be determined whether a numerical value of the stability parameter for specific satellite 101 is larger than a predetermined threshold (e.g. a stability threshold). If the value is larger than the predetermined threshold, a transmission characteristic may be determined in step 402 specifying that pending correction data for specific satellite 101 that may be held available for example at server 3 of system 1 are to be transmitted (e.g. by including a transmission indicator of a Boolean data type in the determined transmission characteristic). For example, the pending correction data may then be transmitted from server 3 to mobile device 2 of system 1.

Additionally or alternatively, if the value is larger than the predetermined threshold, in step 402 a transmission characteristic may be determined specifying that pending correction data for specific satellite 101 that may be held available for example at server 3 of system 1 are to be transmitted (e.g. to mobile device 2 of system 1) according to an increased transmission rate (e.g. 1 transmission per 60 seconds or 10 transmissions per 60 seconds). In such a case, transmission of pending correction data is to be understood as repeating event, since after pending correction data have been transmitted, further (e.g. newer) correction data may be held available (e.g. by server 3 of system 1) as subsequent pending correction data. In such a case, successive pending correction data may be transmitted repeatedly according to a transmission rate.

Determining transmission characteristics for transmitting correction data for specific satellite 101 in step 402 at least partially based on the stability parameter for specific satellite 101 determined in step 401 may be advantageous, because the transmission characteristics may be adapted dynamically in dependence on specific satellite's 101 stability. If for example the stability parameter determined in step 401 indicates that specific satellite 101 is unstable, it may be determined dynamically in step 402 that pending correction data for specific unstable satellite 101 need to be transmitted (e.g. to mobile device 2 such that mobile device 2 can determine an accurate position estimate partially based on a satellite positioning signal 105 received from specific satellite 101 and the transmitted correction data for specific satellite 101). In such a case, it may also be determined dynamically in step 402 that the pending correction data for specific unstable satellite 101 need to be transmitted at an increased transmitting rate, at a shorter transmission interval or at a denser transmission pattern to ensure high positioning accuracy when determining a position estimate based on satellite positioning signal 105 received from specific satellite 101 and the pending correction data for specific satellite 101.

Compared to for example fixed transmission characteristics for transmitting correction data, dynamically determining transmission characteristics in step 402 based on the stability of specific satellite 101 may allow for a compromise between the amount of correction data transmitted to for example mobile device 2 and the achieved positioning accuracy when determining a position estimate for the mobile device's position. This may be advantageous in cases where for example the bandwidth for data transmission via communication path 109 to mobile device 2 is limited.

In an optional step 403, transmitting the pending correction data for the specific satellite is caused, at least partially based on the one or more transmission characteristics for transmitting pending correction data for the specific satellite. For example, transmitting the pending correction data for specific satellite 101 (e.g. to mobile device 2 of system 1 utilizing the pending correction data) is caused in step 403, at least partially based on the one or more transmission characteristics determined in step 402 (e.g. a transmission indicator or a transmission rate determined in step 402) for transmitting pending correction data for specific satellite 101.

For example, if the method steps 401 to 403 are performed by server 3 of system 1 and server 3 also holds available the pending correction data for specific satellite 101, causing of transmitting pending correction data in step 403 may at least comprise causing of sending, at least partially based on the one or more transmission characteristics determined in step 402, the pending correction data for specific satellite 101 by means of for example communication interface 303 of server 3 to at least mobile device 2. In another example, if the method steps 401 to 403 are performed by server 3 of system 1 and the pending correction data for specific satellite 101 are not held available by server 3 but another remote server (e.g. a remote server of system 1), causing of transmitting in step 403 may be understood to mean that server 3 performs sending the one or more transmission characteristics determined in step 402 to the remote server holding available the pending correction data and the remote server subsequently performs sending the pending correction data at least partially based on the one or more transmission characteristics determined in step 402 (e.g. to mobile device 2 via a corresponding communication path between mobile device 2 and the remote server).

In another example, if the method steps 401 to 403 are performed by mobile device 2 of system 1, causing of transmitting pending correction data in step 403 may at least comprise requesting of transmitting, for example at server 3 (or another remote server holding available and providing the pending correction data), the pending correction data for specific satellite 101, such that the pending correction data may be received by mobile device 2.

Figure 5:
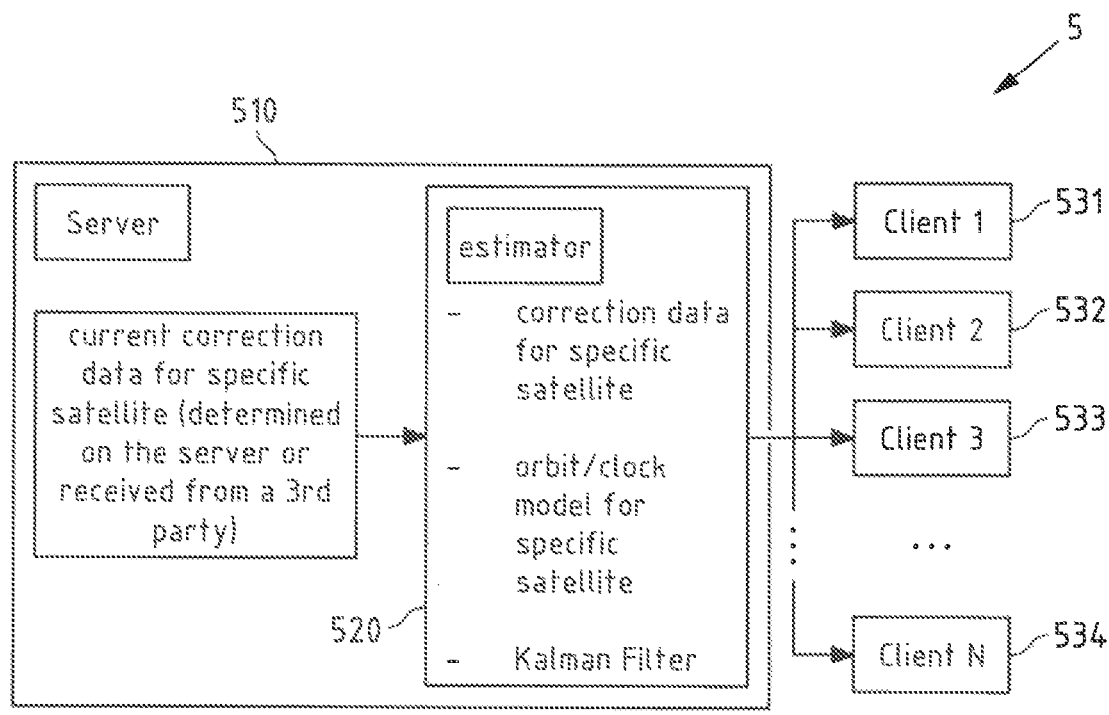
FIG. 5 is a block diagram of another exemplary embodiment of a system according to the invention.

FIG. 5 is a schematic high-level block diagram of a system 5 according to an exemplary aspect of the invention. Without limiting the scope of the invention, it is assumed in the following that system 5 is part of a Global Navigation Satellite System (GNSS) based positioning solution.

For illustrative purposes, FIG. 5 shows a server 510 including an estimator 520 (e.g. estimator 520 may be a part of server 510) as well as a plurality of N clients 531 to 534. It is assumed in the following that system 5 comprises at least server 510 that corresponds to server 3 of FIG. 3 and client 531 that corresponds to mobile device 2 of FIG. 2. Therein, it is further assumed that estimator 520 included in server 510 performs the steps 401 to 403 of flow chart 4 in FIG. 4.

Referring to step 401 as further described above with respect to FIG. 4, estimator 520 may determine one or more stability parameters for a specific satellite based on at least correction data and/or at least one of an orbit model for the specific satellite or a clock model for the specific satellite. Therein, the one or more stability parameters may be determined by applying a filter method (e.g. a Kalman Filter method, an extended Kalman Filter method, an unscented Kalman Filter method or a particle filter method) to correction data for the specific satellite and/or to at least one of an orbit model for the specific satellite or a clock model for the specific satellite. For example, correction data (e.g. orbit correction parameters and/or clock correction parameters) and/or at least one of an orbit model (e.g. orbit model parameters) for the specific satellite or a clock model (e.g. clock model parameters) for the specific satellite may be held available by storing in a memory of server 510 (e.g. in a program memory 301 of server 3 in FIG. 3).

Referring to step 402 as further described above with respect to FIG. 4, estimator 520 may determine, at least partially based on the one or more stability parameters for the specific satellite, one or more transmission characteristics for transmitting pending correction data for the specific satellite. Therein, pending correction data may be given in form of current correction data that are determined by server 510 or that are received at server 510 from another server providing current correction data (e.g. a remote server operated by a third party offering a commercial solution for providing correction data for GNSS based positioning solutions).

Referring to step 403 as further described above with respect to FIG. 4, estimator 520 may cause transmitting, at least partially based on the one or more transmission characteristics for transmitting pending correction data for the specific satellite, the pending correction data for the specific satellite. Therein, causing of transmitting pending correction data may at least comprise causing of sending, at least partially based on the one or more transmission characteristics, the pending correction data for the specific satellite to at least client 531 of the plurality of N clients, at which the received correction data may be utilized when determining a position estimate of client's 531 position.

Figure 6:
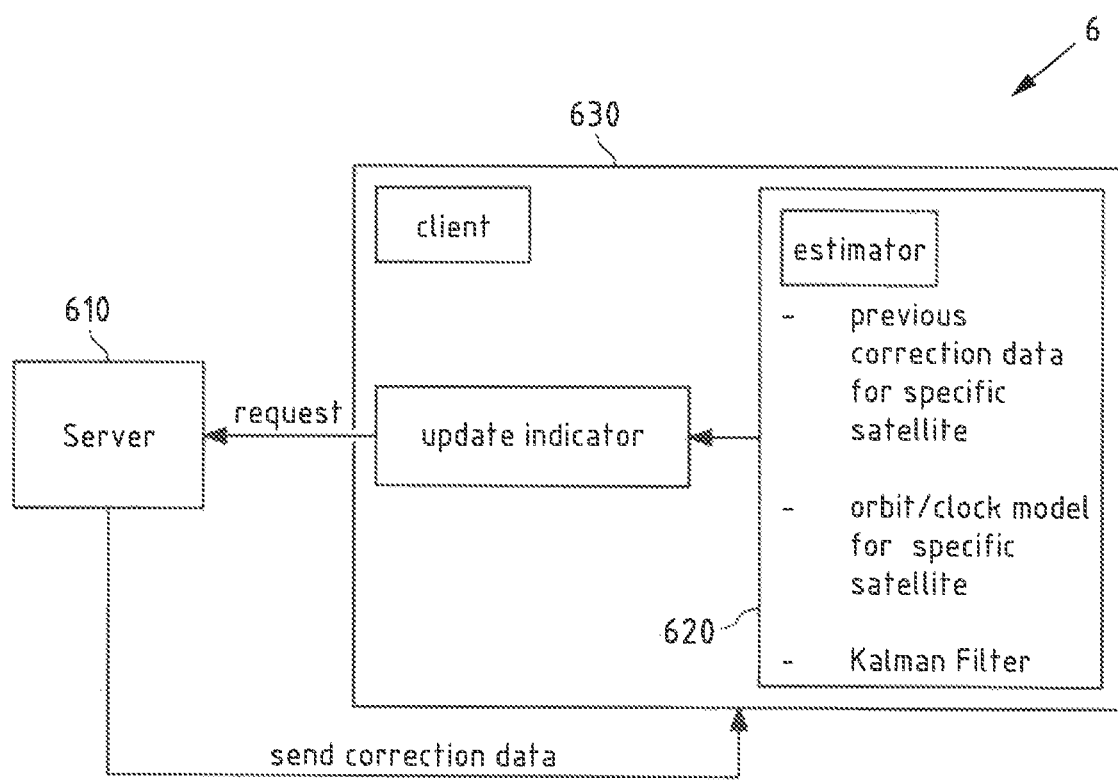
FIG. 6 is a block diagram of another exemplary embodiment of a system according to the invention.

FIG. 6 is a schematic high-level block diagram of a system 6 according to an exemplary aspect of the invention. Without limiting the scope of the invention, it is assumed in the following that system 6 is part of a Global Navigation Satellite System (GNSS) based positioning solution.

For illustrative purposes, FIG. 6 shows a server 610 and a client 630 including an estimator 620 (e.g. estimator 620 may be a part of client 630). It is assumed in the following that system 6 comprises at least server 610 that corresponds to server 3 of FIG. 3 and client 630 that corresponds to mobile device 2 of FIG. 2. Therein, it is further assumed that estimator 620 included in client 630 performs the steps 401 to 403 of flow chart 4 in FIG. 4.

Referring to step 401 as further described above with respect to FIG. 4, estimator 620 may determine one or more stability parameters for a specific satellite (e.g. a specific satellite from which client 630 receives a satellite positioning signal) based on at least correction data (e.g. previous correction data that have already been transmitted to client 630 before performing step 401) and/or at least one of an orbit model for the specific satellite or a clock model for the specific satellite. Therein, the one or more stability parameters may be determined by applying a filter method (e.g. a Kalman Filter method, an extended Kalman Filter method, an unscented Kalman Filter method or a particle filter method) to correction data for the specific satellite and/or at least one of an orbit model for the specific satellite or a clock model for the specific satellite. For example, correction data (e.g. orbit correction parameters and/or clock correction parameters) and/or at least one of an orbit model (e.g. orbit model parameter) for the specific satellite or a clock model (e.g. clock model parameter) for the specific satellite may be held available by storing in a memory of client 630 (e.g. in a program memory 201 of mobile device 2 in FIG. 2).

Referring to step 402 as further described above with respect to FIG. 4, estimator 620 may determine, at least partially based on the one or more stability parameters for the specific satellite, one or more transmission characteristics for transmitting pending correction data for the specific satellite. For example, determining one or more transmission characteristics may comprise determining a transmission indicator (e.g. an update indicator). Therein, pending correction data may be given by current correction data that are determined by server 610 or that are received at server 610 from another server providing current correction data (e.g. a remote server operated by a third party offering a commercial solution for providing correction data for GNSS based positioning solutions).

Referring to step 403 as further described above with respect to FIG. 4, estimator 620 may cause transmitting, at least partially based on the one or more transmission characteristics for transmitting pending correction data for the specific satellite, the pending correction data for the specific satellite. Therein, causing of transmitting pending correction data may at least comprise requesting of transmitting, at server 610 (e.g. by sending a request message to server 610, wherein server 610 provides the pending correction data by holding it available), the pending correction data for the specific satellite such that the pending correction data may be received by client 630. For example, server 610 responses to a request (e.g. a request message) sent by client 630 by sending pending correction data for the specific satellite to client 630.

Figure 7:
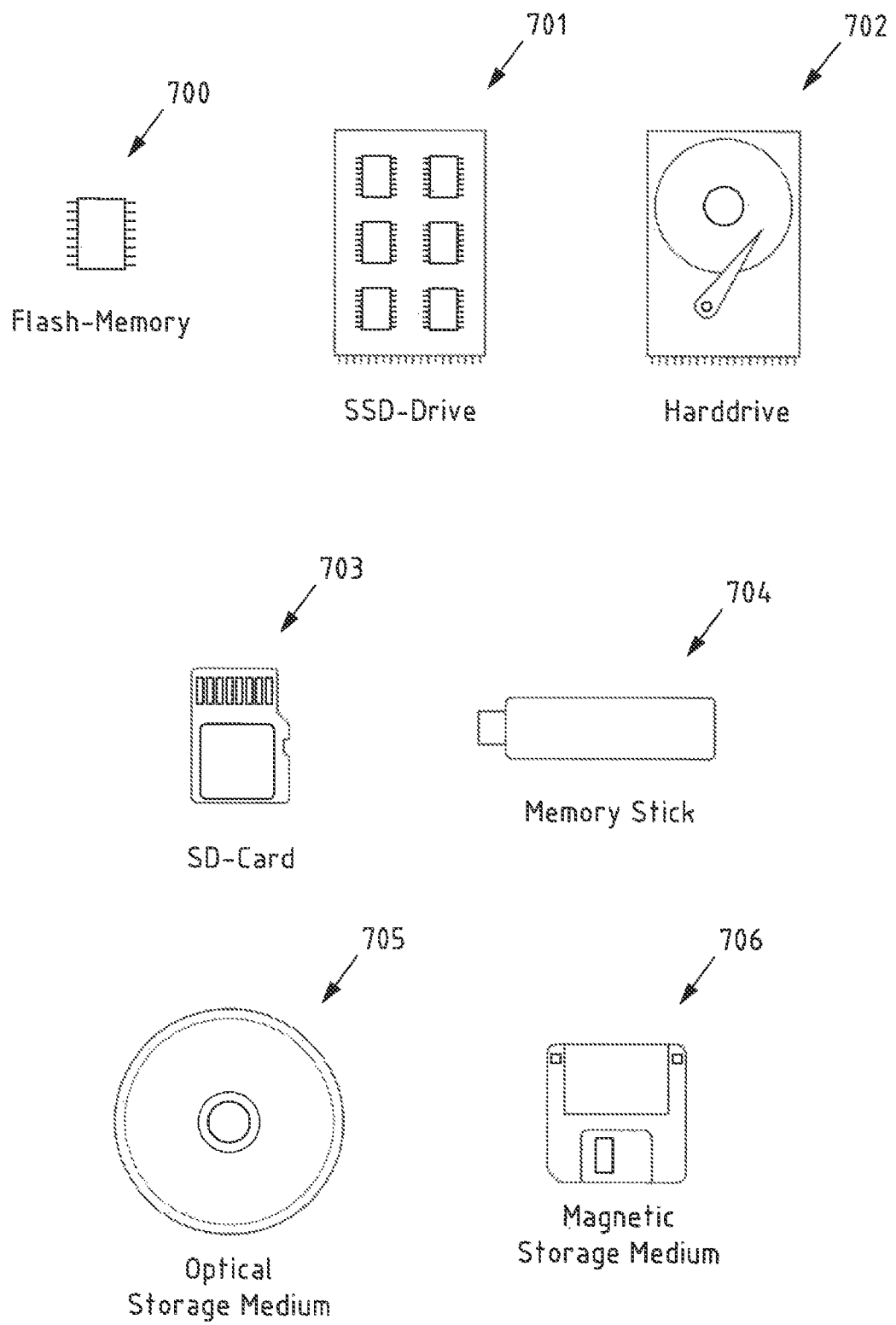
FIG. 7 is a schematic illustration of examples of tangible and non-transitory storage media according to the invention.

FIG. 7 is a schematic illustration of examples of tangible and non-transitory computer-readable storage media according to the present invention that may for instance be used to implement memory 201 of FIG. 2 and memory 301 of FIG. 3. To this end, FIG. 7 displays a flash memory 700, which may for instance be soldered or bonded to a printed circuit board, a solid-state drive 701 comprising a plurality of memory chips (e.g. Flash memory chips), a magnetic hard drive 702, a Secure Digital (SD) card 703, a Universal Serial Bus (USB) memory stick 704, an optical storage medium 705 (such as for instance a CD-ROM or DVD) and a magnetic storage medium 706.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (1) to a combination of processor(s) or (2) to sections of processor(s)/software (including digital signal processor(s)), software, and memory(ies) that work together to cause an apparatus, such as a mobile device, to perform various functions) and (c) to circuits, such as a microprocessor(s) or a section of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (1) A, or (2) B, or (3) C, or (4) A and B, or (5) A and C, or (6) B and C, or (7) A and B and C.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

That which is claimed:

1. A method, performed by at least one apparatus, comprising:

obtaining or determining one or more stability parameters for a specific satellite, wherein the one or more stability parameters comprise at least one of a clock stability parameter indicative of a stability of a clock of the specific satellite or an orbit stability parameter indicative of the stability of an orbit of the specific satellite; and determining one or more transmission characteristics for transmitting correction data for the specific satellite at least partially based on whether the one or more stability parameters indicate that the specific satellite is stable or unstable, a degree of stability of the specific satellite as indicated by the one or more stability parameters or a change in value of the one or more stability parameters, wherein the one or more transmission characteristics comprise a transmission time, rate, interval or pattern, and wherein the correction data comprises at least one of orbital correction parameters or clock correction parameters.

2. The method according to claim 1, further comprising: causing of transmitting, at least partially based on the one or more transmission characteristics for transmitting correction data for the specific satellite, the correction data for the specific satellite.

3. The method according to claim 2, wherein the specific satellite is a satellite of one satellite navigation system of the following:

a NAVSTAR GPS navigation satellite system;
a GLONASS navigation satellite system;
a GALILEO navigation satellite system;
a BeiDou navigation satellite system;
an IRNSS navigation satellite system; or
a QZSS navigation satellite system.

4. The method according to claim 2, wherein the causing of transmitting the correction data for the specific satellite further comprises:

causing of sending, at least partially based on the one or more transmission characteristics for transmitting correction data for the specific satellite, the correction data for the specific satellite to at least one mobile device of a plurality of mobile devices.

5. The method according to claim 4, wherein a position estimate of a position of the at least one mobile device is determined at least partially based on the sent correction data for the specific satellite and a satellite positioning signal received from each satellite of a plurality of satellites, wherein the plurality of satellites includes the specific satellite.

6. The method according to claim 4, wherein the method is performed for the specific satellite and for at least one further specific satellite and wherein the causing of transmitting correction data for the specific satellite and the causing of transmitting correction data for the at least one further specific satellite further comprises:
assembling, at least partially based on the one or more transmission characteristics for transmitting correction data for the specific satellite and the one or more transmission characteristics for transmitting correction data for the at least one further specific satellite, the correction data for the specific satellite and the correction data for the at least one further specific satellite; and
causing of sending, at least partially based on the one or more transmission characteristics for transmitting correction data for the specific satellite and the one or more transmission characteristics for transmitting correction data for the at least one further specific satellite, the assembled correction data for the specific satellite and correction data for the at least one further specific satellite to the at least one mobile device of the plurality of mobile devices.

7. The method according to claim 2, wherein the causing of transmitting further comprises:
requesting of transmitting, at a remote server, at least partially based on the one or more transmission characteristics for transmitting correction data for the specific satellite, the correction data for the specific satellite; and
receiving the correction data for the specific satellite from the remote server.

8. The method according to claim 7, further comprising:
receiving a satellite positioning signal from each satellite of a plurality of satellites, wherein the plurality of satellites includes the specific satellite, and
determining a position estimate at least partially based on the received correction data for the specific satellite and the received satellite positioning signal from each satellite.

9. The method according to claim 1, wherein the a clock stability parameter is indicative of a difference between an emission time of a satellite positioning signal that is based on clock offset data provided by the specific satellite and a true emission time of the satellite positioning signal by the specific satellite; or
an orbit stability parameter indicative of a difference between an orbital position based on satellite ephemeris data of the specific satellite and a true orbital position of the specific satellite.

10. The method according to claim 1, wherein determining the one or more stability parameters for the specific satellite at least partially depends on at least one of:
an orbit model for the specific satellite;
a clock model for the specific satellite; or
correction data for the specific satellite.

11. The method according to claim 1, wherein the one or more transmission characteristics for transmitting correction data for the specific satellite further comprise one or more of the following or information on one or more of the following:
an identifier of the specific satellite; or
a transmission indicator.

12. The method according to claim 1, wherein determining the one or more stability parameters for the specific satellite at least partially depends on the correction data for the specific satellite.

13. An apparatus comprising:
a processor; and
a memory storing computer program code,
wherein the processor is configured to execute the computer program code to:
obtain or determine one or more stability parameters for a specific satellite, wherein the one or more stability parameters comprise at least one of a clock stability parameter indicative of a stability of a clock of the specific satellite or an orbit stability parameter indicative of the stability of an orbit of the specific satellite; and
determine, at least partially based on the one or more stability parameters for the specific satellite, one or more transmission characteristics for transmitting correction data for the specific satellite at least partially based on whether the one or more stability parameters indicate that the specific satellite is stable or unstable, a degree of stability of the specific satellite as indicated by the one or more stability parameters or a change in value of the one or more stability parameters, wherein the one or more transmission characteristics comprise a transmission time, rate, interval or pattern, and wherein the correction data comprises at least one of orbital correction parameters or clock correction parameters.

14. The apparatus according to claim 13, wherein the processor is further configured to execute computer program code to:
cause transmission, at least partially based on the one or more transmission characteristics for transmitting correction data for the specific satellite, of the correction data for the specific satellite.

15. The apparatus according to claim 14, wherein the processor is configured to execute computer program code to cause transmission of the correction data for the specific satellite further by:
causing of sending, at least partially based on the one or more transmission characteristics for transmitting correction data for the specific satellite, the correction data for the specific satellite to at least one mobile device of a plurality of mobile devices.

16. The apparatus according to claim 15, wherein a position estimate of a position of the at least one mobile device is determined at least partially based on the sent correction data for the specific satellite and a satellite positioning signal received from each satellite of a plurality of satellites, wherein the plurality of satellites includes the specific satellite.

17. The apparatus according to claim 15, wherein one or more transmission characteristics are determined for the specific satellite and for at least one further specific satellite and wherein the processor is configured to execute computer program code to cause transmission of correction data for the specific satellite and to cause transmission of correction data for the at least one further specific satellite by:
assembling, at least partially based on the one or more transmission characteristics for transmitting correction data for the specific satellite and the one or more transmission characteristics for transmitting correction data for the at least one further specific satellite, the correction data for the specific satellite and the correction data for the at least one further specific satellite; and causing of sending, at least partially based on the one or more transmission characteristics for transmitting correction data for the specific satellite and the one or more transmission characteristics for transmitting correction data for the at least one further specific satellite, the assembled correction data for the specific satellite and correction data for the at least one further specific satellite to the at least one mobile device of the plurality of mobile devices.

18. The apparatus according to claim 14, wherein the processor is configured to execute computer program code to cause transmission by:

requesting of transmitting, at a remote server, at least partially based on the one or more transmission characteristics for transmitting correction data for the specific satellite, the correction data for the specific satellite; and receiving the correction data for the specific satellite from the remote server.

19. The apparatus according to claim 18, wherein the processor is further configured to execute computer program code to:

receive a satellite positioning signal from each satellite of a plurality of satellites, wherein the plurality of satellites includes the specific satellite, and determine a position estimate at least partially based on the received correction data for the specific satellite and the received satellite positioning signal from each satellite.

20. A non-transitory computer readable storage medium storing computer program code configured to cause an apparatus to:

obtain or determine one or more stability parameters for a specific satellite, wherein the one or more stability parameters comprise at least one of a clock stability parameter indicative of a stability of a clock of the specific satellite or an orbit stability parameter indicative of the stability of an orbit of the specific satellite; and determine, at least partially based on the one or more stability parameters for the specific satellite, one or more transmission characteristics for transmitting correction data for the specific satellite at least partially based on whether the one or more stability parameters indicate that the specific satellite is stable or unstable, a degree of stability of the specific satellite as indicated by the one or more stability parameters or a change in value of the one or more stability parameters, wherein the one or more transmission characteristics comprise a transmission time, rate, interval or pattern, and wherein the correction data comprises at least one of orbital correction parameters or clock correction parameters.

* * * * *